(12) United States Patent
Ang et al.

(10) Patent No.: US 10,432,378 B2
(45) Date of Patent: Oct. 1, 2019

(54) USE OF REFERENCE SIGNALS TO IMPROVE USER EQUIPMENT (UE) WARM-UP BEFORE TRANSITIONING FROM AN OFF DURATION OF THE UE TO AN ON DURATION OF THE UE WITH RESPECT TO A RADIO FREQUENCY SPECTRUM BAND

(71) Applicant: QUALCOMM Incorporated, San Diego, CA (US)

(72) Inventors: Peter Pui Lok Ang, San Diego, CA (US); Krishna Kiran Mukkavilli, San Diego, CA (US); Raghu Challa, San Diego, CA (US); Yang Yang, San Diego, CA (US); Alexei Yurievitch Gorokhov, San Diego, CA (US); Tingfang Ji, San Diego, CA (US); Joseph Binamira Soriaga, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/717,713

(22) Filed: Sep. 27, 2017

(65) Prior Publication Data

US 2018/0097598 A1 Apr. 5, 2018

Related U.S. Application Data

(60) Provisional application No. 62/403,018, filed on Sep. 30, 2016, provisional application No. 62/417,171, filed on Nov. 3, 2016.

(51) Int. Cl.
*H04L 5/00* (2006.01)
*H04W 48/08* (2009.01)
(Continued)

(52) U.S. Cl.
CPC .......... *H04L 5/0051* (2013.01); *H04L 5/0048* (2013.01); *H04L 5/0053* (2013.01);
(Continued)

(58) Field of Classification Search
None
See application file for complete search history.

(56) References Cited

U.S. PATENT DOCUMENTS 8,385,241 B2 * 2/2013 Yu ........................ H04W 72/042
370/311
2009/0239476 A1 * 9/2009 Womack ............... H04L 5/0094
455/68

(Continued)

FOREIGN PATENT DOCUMENTS

WO WO-2016007472 A1 1/2016
WO WO-2016022064 A2 2/2016

OTHER PUBLICATIONS

International Search Report and Written Opinion—PCT/US2017/054079—ISA/EPO—dated Dec. 19, 2017.

(Continued)

*Primary Examiner* — Jutai Kao
(74) *Attorney, Agent, or Firm* — Holland & Hart LLP

(57) ABSTRACT

Techniques are described for wireless communication. A method for wireless communication at a user equipment (UE) includes identifying a transmission timing of a control reference signal transmitted over a radio frequency spectrum band during an OFF duration of the UE with respect to the radio frequency spectrum band, in which the identified transmission timing is relative to a transition from the OFF duration to an ON duration of the UE with respect to the radio frequency spectrum band; receiving the control reference signal at the identified transmission timing; and performing a warm-up procedure, before the ON duration, based at least in part on the identified transmission timing of (Continued)

the control reference signal. A method for wireless communication at a wireless network includes indicating, to the UE, the transmission timing of the control reference signal; and transmitting the control reference signal at the indicated transmission timing. The OFF duration and the ON duration are coordinated with a wireless network.

30 Claims, 20 Drawing Sheets

(51) Int. Cl.
*H04W 52/02* (2009.01)
*H04W 76/28* (2018.01)
*H04W 88/02* (2009.01)

(52) U.S. Cl.
CPC ........... *H04L 5/0078* (2013.01); *H04W 48/08* (2013.01); *H04W 52/0216* (2013.01); *H04W 52/0245* (2013.01); *H04W 76/28* (2018.02); *H04W 88/02* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/20* (2018.01); *Y02D 70/22* (2018.01); *Y02D 70/24* (2018.01)

(56) References Cited

U.S. PATENT DOCUMENTS

| | | | |
|---|---|---|---|
| 2014/0269368 A1* | 9/2014 | Xu | H04W 24/00 370/252 |
| 2014/0301263 A1 | 10/2014 | Ji et al. | |
| 2015/0126206 A1* | 5/2015 | Krishnamurthy | H04W 76/18 455/452.1 |
| 2015/0189613 A1* | 7/2015 | Chen | H04W 56/004 370/311 |

OTHER PUBLICATIONS

QUALCOMM Incorporated: "Remaining Details of CSI Measurement and Reporting in eIMTA", R1-141434, 3rd Generation Partnership Project (3GPP), Mobile Competence Centre; 650, Route Des Lucioles; F-06921 Sophia-Anti Polls Cedex; France, vol. RAN WG1, No. Shenzhen, China; Apr. 4, 2014, pp. 1-6, Retrieved from the Internet: URL:http://www.3gpp.org/ftp/Meetings_3GPP_SYNC/RAN1/Docs.

* cited by examiner

USE OF REFERENCE SIGNALS TO IMPROVE USER EQUIPMENT (UE) WARM-UP BEFORE TRANSITIONING FROM AN OFF DURATION OF THE UE TO AN ON DURATION OF THE UE WITH RESPECT TO A RADIO FREQUENCY SPECTRUM BAND

CROSS REFERENCES

The present Application for Patent claims priority to U.S. Provisional Patent Application No. 62/403,018 by Ang, et al., entitled "Use of Reference Signals To Improve User Equipment Warm-Up Before Transitioning From An Off Duration To An On Duration Of A Discontinuous Reception Cycle," filed Sep. 30, 2016, and to U.S. Provisional Patent Application No. 62/417,171 by Ang, et al., entitled "Use of Reference Signals To Improve User Equipment (UE) Warm-Up Before Transitioning From An Off Duration Of The UE To An On Duration Of The UE With Respect To A Radio Frequency Spectrum Band," filed Nov. 3, 2016, assigned to the assignee hereof.

INTRODUCTION

The present disclosure, for example, relates to wireless communication systems, and more particularly to the use of reference signals to improve user equipment (UE) warm-up before a UE transitions from an OFF duration of the UE with respect to a radio frequency spectrum band to an ON duration of the UE with respect to the radio frequency spectrum band.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of network access devices, each simultaneously supporting communication for multiple communication devices, otherwise known as user equipment (UEs). In a Long-Term Evolution (LTE) or LTE-Advanced (LTE-A) network, a network access device may take the form of a base station, with a set of one or more base stations defining an eNodeB (eNB). In a next generation or 5G network, a network access device may take the form of a smart radio head (or radio head (RH)) or access node controller (ANC), with a set of smart radio heads in communication with an ANC defining an eNB. A base station or smart radio head may communicate with a set of UEs on downlink channels (e.g., for transmissions from a base station or smart radio head to a UE) and uplink channels (e.g., for transmissions from a UE to a base station or smart radio head).

At times, a UE may operate in accordance with a discontinuous reception (DRX) cycle to save power. When operating in accordance with a DRX cycle, a UE may wake-up and actively communicate with a network access device during an ON duration of the DRX cycle, and may enter a sleep state during an OFF duration of the DRX cycle. A UE may also operate in accordance with other cycles or schemes in which the UE transitions between OFF durations with respect to a radio frequency spectrum band (e.g., durations in which the UE may abstain from reception or transmission over the radio frequency spectrum band) and ON durations with respect to the radio frequency spectrum band, which OFF durations and ON durations are coordinated with a wireless network (e.g., with a network access device of the wireless network).

SUMMARY

A method for wireless communication at a UE is described. The method may include identifying a transmission timing of a control reference signal transmitted over a radio frequency spectrum band during an OFF duration of the UE with respect to the radio frequency spectrum band, in which the identified transmission timing is relative to a transition from the OFF duration to an ON duration of the UE with respect to the radio frequency spectrum band; receiving the control reference signal at the identified transmission timing; and performing a warm-up procedure, before the ON duration, based at least in part on the identified transmission timing of the control reference signal. The OFF duration and the ON duration may be coordinated with a wireless network.

In some examples, the method may include receiving an indication of a semi-static configuration of the transmission timing. In some examples, the indication of the semi-static configuration of the transmission timing may be received in at least one of: system information, or radio resource control (RRC) signaling, or a combination thereof.

In some examples, the method may include receiving, during a pre-wake-up duration between the transmission timing of the control reference signal and the ON duration, an indication of an aperiodic channel state information reference signal (CSI-RS) transmission timing, in which the aperiodic CSI-RS transmission timing is between the pre-wake-up duration and the ON duration; and receiving an aperiodic CSI-RS in accordance with the aperiodic CSI-RS transmission timing. In some examples, the method may include receiving a transmission request during a pre-wake-up duration between the transmission timing of the control reference signal and the ON duration, in which the transmission request is associated with a transmission by the UE before the ON duration. In some examples, the transmission request may be associated with a second transmission timing, and an indication of the second transmission timing may be received during the pre-wake-up duration. In some examples, the method may include transmitting, before the ON duration and based at least in part on the transmission request, at least one of: aperiodic channel state information (CSI), or a sounding reference signal (SRS), or channel quality information (CQI), or a combination thereof.

In some examples, the method may include receiving, in a first transmission time interval (TTI) of the ON duration, a first instance of a type of reference signal, in which the first instance of the type of reference signal has a higher density than a second instance of the type of reference signal received in a second TTI having a later timing than the first TTI. In some examples, the higher density may include at least one of: a first higher density in time, or a second higher density in frequency, or a combination thereof. In some examples, the OFF duration and the ON duration may be part of a DRX cycle.

An apparatus for wireless communication at a UE is described. The apparatus may include means for identifying a transmission timing of a control reference signal transmitted over a radio frequency spectrum band during an OFF duration of the UE with respect to the radio frequency spectrum band, in which the identified transmission timing is relative to a transition from the OFF duration to an ON duration of the UE with respect to the radio frequency spectrum band; means for receiving the control reference signal at the identified transmission timing; and means for performing a warm-up procedure, before the ON duration, based at least in part on the identified transmission timing of the control reference signal. The OFF duration and the ON duration may be coordinated with a wireless network.

In some examples, the apparatus may include means for receiving an indication of a semi-static configuration of the transmission timing. In some examples, the indication of the semi-static configuration of the transmission timing may be received in at least one of: system information, or RRC signaling, or a combination thereof.

In some examples, the apparatus may include means for receiving, during a pre-wake-up duration between the transmission timing of the control reference signal and the ON duration, an indication of an aperiodic CSI-RS transmission timing, in which the aperiodic CSI-RS transmission timing is between the pre-wake-up duration and the ON duration; and means for receiving an aperiodic CSI-RS in accordance with the aperiodic CSI-RS transmission timing. In some examples, the apparatus may include means for receiving a transmission request during a pre-wake-up duration between the transmission timing of the control reference signal and the ON duration, in which the transmission request is associated with a transmission by the UE before the ON duration. In some examples, the transmission request may be associated with a second transmission timing, and an indication of the second transmission timing may be received during the pre-wake-up duration. In some examples, the apparatus may include means for transmitting, before the ON duration and based at least in part on the transmission request, at least one of: aperiodic CSI, or an SRS, or CQI, or a combination thereof.

In some examples, the apparatus may include means for receiving, in a first TTI of the ON duration, a first instance of a type of reference signal, in which the first instance of the type of reference signal has a higher density than a second instance of the type of reference signal received in a second TTI having a later timing than the first TTI. In some examples, the higher density may include at least one of: a first higher density in time, or a second higher density in frequency, or a combination thereof. In some examples, the OFF duration and the ON duration may be part of a DRX cycle.

Another apparatus for wireless communication at a UE is described. The apparatus may include a processor, memory in electronic communication with the processor, and instructions stored in the memory. The instructions may be executable by the processor to identify a transmission timing of a control reference signal transmitted over a radio frequency spectrum band during an OFF duration of the UE with respect to the radio frequency spectrum band, in which the identified transmission timing is relative to a transition from the OFF duration to an ON duration of the UE with respect to the radio frequency spectrum band; to receive the control reference signal at the identified transmission timing; and to perform a warm-up procedure, before the ON duration, based at least in part on the identified transmission timing of the control reference signal. The OFF duration and the ON duration may be coordinated with a wireless network.

In some examples, the apparatus may include instructions executable by the processor to receive an indication of a semi-static configuration of the transmission timing. In some examples, the indication of the semi-static configuration of the transmission timing may be received in at least one of: system information, or RRC signaling, or a combination thereof.

In some examples, the apparatus may include instructions executable by the processor to receive, during a pre-wake-up duration between the transmission timing of the control reference signal and the ON duration, an indication of an aperiodic CSI-RS transmission timing, in which the aperiodic CSI-RS transmission timing is between the pre-wake-up duration and the ON duration; and to receive an aperiodic CSI-RS in accordance with the aperiodic CSI-RS transmission timing. In some examples, the apparatus may include instructions executable by the processor to receive a transmission request during a pre-wake-up duration between the transmission timing of the control reference signal and the ON duration, in which the transmission request is associated with a transmission by the UE before the ON duration. In some examples, the transmission request may be associated with a second transmission timing, and an indication of the second transmission timing may be received during the pre-wake-up duration. In some examples, the apparatus may include instructions executable by the processor to transmit, before the ON duration and based at least in part on the transmission request, at least one of: aperiodic CSI, or an SRS, or CQI, or a combination thereof.

In some examples, the apparatus may include instructions executable by the processor to receive, in a first TTI of the ON duration, a first instance of a type of reference signal, in which the first instance of the type of reference signal has a higher density than a second instance of the type of reference signal received in a second TTI having a later timing than the first TTI. In some examples, the higher density may include at least one of: a first higher density in time, or a second higher density in frequency, or a combination thereof. In some examples, the OFF duration and the ON duration may be part of a DRX cycle.

A non-transitory computer-readable medium storing computer-executable code for wireless communication at a receiving device is described. The code may be executable by the processor to identify a transmission timing of a control reference signal transmitted over a radio frequency spectrum band during an OFF duration of the UE with respect to the radio frequency spectrum band, in which the identified transmission timing is relative to a transition from the OFF duration to an ON duration of the UE with respect to the radio frequency spectrum band; to receive the control reference signal at the identified transmission timing; and to perform a warm-up procedure, before the ON duration, based at least in part on the identified transmission timing of the control reference signal. The OFF duration and the ON duration may be coordinated with a wireless network.

In some examples, the computer-readable medium may include code executable by the processor to receive an indication of a semi-static configuration of the transmission timing. In some examples, the indication of the semi-static configuration of the transmission timing may be received in at least one of: system information, or RRC signaling, or a combination thereof.

In some examples, the computer-readable medium may include code executable by the processor to receive, during a pre-wake-up duration between the transmission timing of the control reference signal and the ON duration, an indication of an aperiodic CSI-RS transmission timing, in which the aperiodic CSI-RS transmission timing is between the pre-wake-up duration and the ON duration; and to receive an aperiodic CSI-RS in accordance with the aperiodic CSI-RS transmission timing. In some examples, the computer-readable medium may include code executable by the processor to receive a transmission request during a pre-wake-up duration between the transmission timing of the control reference signal and the ON duration, in which the transmission request is associated with a transmission by the UE before the ON duration. In some examples, the transmission request may be associated with a second transmission timing, and an indication of the second transmission timing may be received during the pre-wake-up duration. In some examples, the computer-readable medium may include code executable by the processor to transmit, before the ON duration and based at least in part on the transmission request, at least one of: aperiodic CSI, or an SRS, or CQI, or a combination thereof.

In some examples, the computer-readable medium may include code executable by the processor to receive, in a first TTI of the ON duration, a first instance of a type of reference signal, in which the first instance of the type of reference signal has a higher density than a second instance of the type of reference signal received in a second TTI having a later timing than the first TTI. In some examples, the higher density may include at least one of: a first higher density in time, or a second higher density in frequency, or a combination thereof. In some examples, the OFF duration and the ON duration may be part of a DRX cycle.

A method for wireless communication at a wireless network is described. The method may include indicating, to a UE, a transmission timing of a control reference signal transmitted over a radio frequency spectrum band during an OFF duration of the UE with respect to the radio frequency spectrum band, in which the indicated transmission timing is relative to a transition from the OFF duration to an ON duration of the UE with respect to the radio frequency spectrum band; and transmitting the control reference signal at the indicated transmission timing. The OFF duration and the ON duration may be coordinated between the UE and the wireless network.

In some examples of the method, indicating the transmission timing of the control reference signal may include transmitting an indication of a semi-static configuration of the transmission timing. In some examples, the indication of the semi-static configuration of the transmission timing may be transmitted in at least one of: system information, or RRC signaling, or a combination thereof.

In some examples, the method may include transmitting, during a pre-wake-up duration between the transmission timing of the control reference signal and the ON duration, an indication of an aperiodic CSI-RS transmission timing, in which the aperiodic CSI-RS transmission timing is between the pre-wake-up duration and the ON duration; and transmitting an aperiodic CSI-RS in accordance with the aperiodic CSI-RS transmission timing. In some examples, the method may include transmitting a transmission request during a pre-wake-up duration between the transmission timing of the control reference signal and the ON duration, in which the transmission request is associated with a transmission by the UE before the ON duration. In some examples, the transmission request may be associated with a second transmission timing, and an indication of the second transmission timing may be transmitted during the pre-wake-up duration. In some examples, the method may include receiving, before the ON duration and based at least in part on the transmission request, at least one of: aperiodic CSI, or an SRS, or CQI, or a combination thereof.

In some examples, the method may include transmitting, in a first TTI of the ON duration, a first instance of a type of reference signal, in which the first instance of the type of reference signal has a higher density than a second instance of the type of reference signal transmitted in a second TTI having a later timing than the first TTI. In some examples, the higher density may include at least one of: a first higher density in time, or a second higher density in frequency, or a combination thereof. In some examples, the OFF duration and the ON duration may be part of a DRX cycle.

An apparatus for wireless communication at a wireless network is described. The apparatus may include means for indicating, to a UE, a transmission timing of a control reference signal transmitted over a radio frequency spectrum band during an OFF duration of the UE with respect to the radio frequency spectrum band, in which the indicated transmission timing is relative to a transition from the OFF duration to an ON duration of the UE with respect to the radio frequency spectrum band; and means for transmitting the control reference signal at the indicated transmission timing. The OFF duration and the ON duration may be coordinated between the UE and the wireless network.

In some examples of the apparatus, the means for indicating the transmission timing of the control reference signal may include means for transmitting an indication of a semi-static configuration of the transmission timing. In some examples, the indication of the semi-static configuration of the transmission timing may be transmitted in at least one of: system information, or RRC signaling, or a combination thereof.

In some examples, the apparatus may include means for transmitting, during a pre-wake-up duration between the transmission timing of the control reference signal and the ON duration, an indication of an aperiodic CSI-RS transmission timing, in which the aperiodic CSI-RS transmission timing is between the pre-wake-up duration and the ON duration; and means for transmitting an aperiodic CSI-RS in accordance with the aperiodic CSI-RS transmission timing. In some examples, the apparatus may include means for transmitting a transmission request during a pre-wake-up duration between the transmission timing of the control reference signal and the ON duration, in which the transmission request is associated with a transmission by the UE before the ON duration. In some examples, the transmission request may be associated with a second transmission timing, and an indication of the second transmission timing may be transmitted during the pre-wake-up duration. In some examples, the apparatus may include means for receiving, before the ON duration and based at least in part on the transmission request, at least one of: aperiodic CSI, or an SRS, or CQI, or a combination thereof.

In some examples, the apparatus may include means for transmitting, in a first TTI of the ON duration, a first instance of a type of reference signal, in which the first instance of the type of reference signal has a higher density than a second instance of the type of reference signal transmitted in a second TTI having a later timing than the first TTI. In some examples, the higher density may include at least one of: a first higher density in time, or a second higher density in frequency, or a combination thereof. In some examples, the OFF duration and the ON duration may be part of a DRX cycle.

Another apparatus for wireless communication at a wireless network is described. The apparatus may include a processor, memory in electronic communication with the processor, and instructions stored in the memory. The instructions may be executable by the processor to indicate, to a UE, a transmission timing of a control reference signal transmitted over a radio frequency spectrum band during an OFF duration of the UE with respect to the radio frequency spectrum band, in which the indicated transmission timing is relative to a transition from the OFF duration to an ON duration of the UE with respect to the radio frequency spectrum band; and to transmit the control reference signal at the indicated transmission timing. The OFF duration and the ON duration may be coordinated between the UE and the wireless network.

In some examples of the apparatus, the instructions executable by the processor to indicate the transmission timing of the control reference signal may include instructions executable by the processor to transmit an indication of a semi-static configuration of the transmission timing. In some examples, the indication of the semi-static configuration of the transmission timing may be transmitted in at least one of: system information, or RRC signaling, or a combination thereof.

In some examples, the apparatus may include instructions executable by the processor to transmit, during a pre-wake-up duration between the transmission timing of the control reference signal and the ON duration, an indication of an aperiodic CSI-RS transmission timing, in which the aperiodic CSI-RS transmission timing is between the pre-wake-up duration and the ON duration; and to transmit an aperiodic CSI-RS in accordance with the aperiodic CSI-RS transmission timing. In some examples, the apparatus may include instructions executable by the processor to transmit a transmission request during a pre-wake-up duration between the transmission timing of the control reference signal and the ON duration, in which the transmission request is associated with a transmission by the UE before the ON duration. In some examples, the transmission request may be associated with a second transmission timing, and an indication of the second transmission timing may be transmitted during the pre-wake-up duration. In some examples, the apparatus may include instructions executable by the processor to receive, before the ON duration and based at least in part on the transmission request, at least one of: aperiodic CSI, or an SRS, or CQI, or a combination thereof.

In some examples, the apparatus may include instructions executable by the processor to transmit, in a first TTI of the ON duration, a first instance of a type of reference signal, in which the first instance of the type of reference signal has a higher density than a second instance of the type of reference signal transmitted in a second TTI having a later timing than the first TTI. In some examples, the higher density may include at least one of: a first higher density in time, or a second higher density in frequency, or a combination thereof. In some examples, the OFF duration and the ON duration may be part of a DRX cycle.

A non-transitory computer-readable medium storing computer-executable code for wireless communication at a receiving device is described. The code may be executable by the processor to indicate, to a UE, a transmission timing of a control reference signal transmitted over a radio frequency spectrum band during an OFF duration of the UE with respect to the radio frequency spectrum band, in which the indicated transmission timing is relative to a transition from the OFF duration to an ON duration of the UE with respect to the radio frequency spectrum band; and to transmit the control reference signal at the indicated transmission timing. The OFF duration and the ON duration may be coordinated between the UE and the wireless network.

In some examples of the computer-readable medium, the code executable by the processor to indicate the transmission timing of the control reference signal may include code executable by the processor to transmit an indication of a semi-static configuration of the transmission timing. In some examples, the indication of the semi-static configuration of the transmission timing may be transmitted in at least one of: system information, or RRC signaling, or a combination thereof.

In some examples, the computer-readable medium may include code executable by the processor to transmit, during a pre-wake-up duration between the transmission timing of the control reference signal and the ON duration, an indication of an aperiodic CSI-RS transmission timing, in which the aperiodic CSI-RS transmission timing is between the pre-wake-up duration and the ON duration; and to transmit an aperiodic CSI-RS in accordance with the aperiodic CSI-RS transmission timing. In some examples, the computer-readable medium may include code executable by the processor to transmit a transmission request during a pre-wake-up duration between the transmission timing of the control reference signal and the ON duration, in which the transmission request is associated with a transmission by the UE before the ON duration. In some examples, the transmission request may be associated with a second transmission timing, and an indication of the second transmission timing may be transmitted during the pre-wake-up duration. In some examples, the computer-readable medium may include code executable by the processor to receive, before the ON duration and based at least in part on the transmission request, at least one of: aperiodic CSI, or an SRS, or CQI, or a combination thereof.

In some examples, the computer-readable medium may include code executable by the processor to transmit, in a first TTI of the ON duration, a first instance of a type of reference signal, in which the first instance of the type of reference signal has a higher density than a second instance of the type of reference signal transmitted in a second TTI having a later timing than the first TTI. In some examples, the higher density may include at least one of: a first higher density in time, or a second higher density in frequency, or a combination thereof. In some examples, the OFF duration and the ON duration may be part of a DRX cycle.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
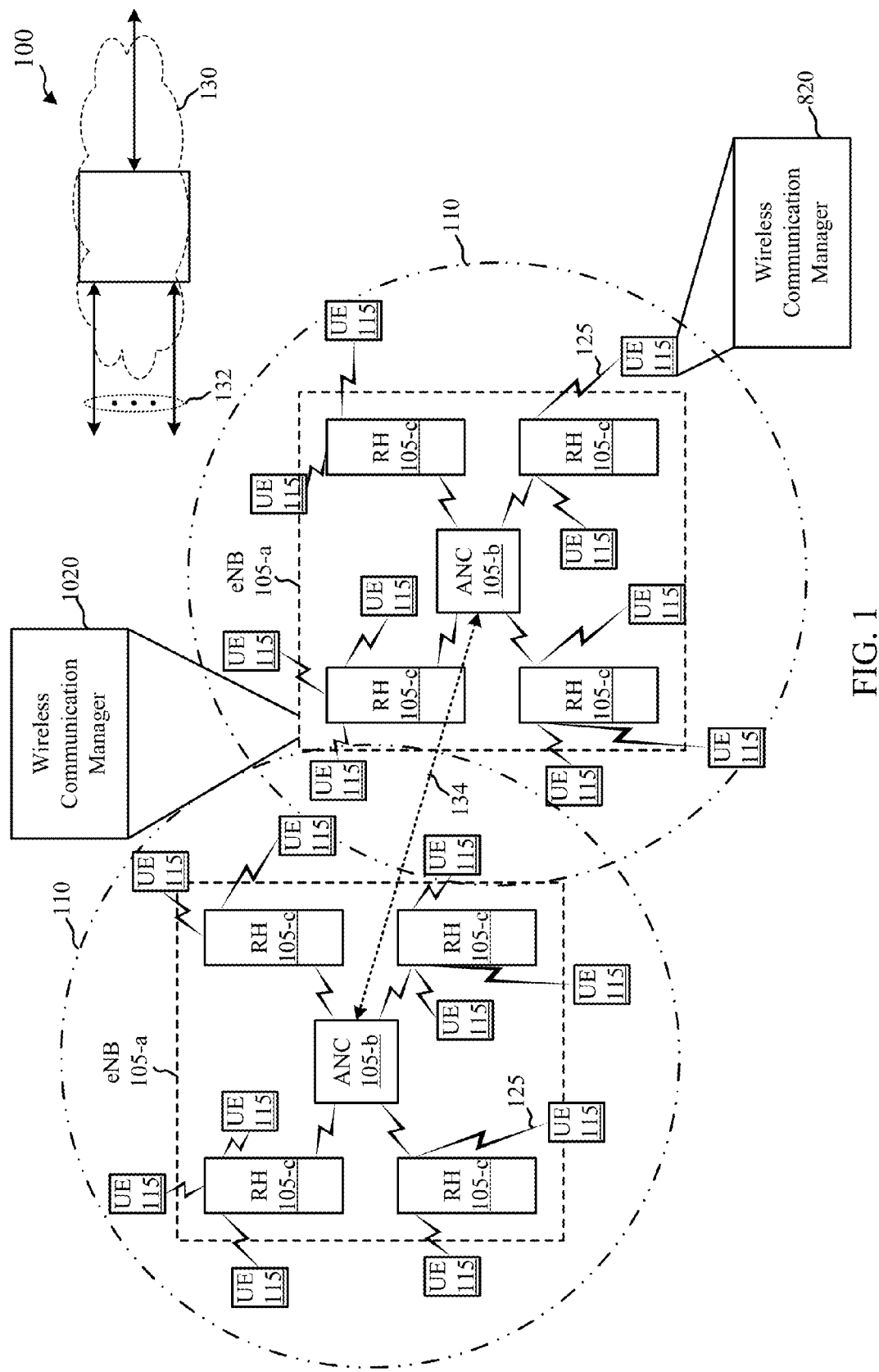
FIG. 1 shows an example of a wireless communication system, in accordance with one or more aspects of the disclosure.

Techniques are described in which reference signals are transmitted or received to improve UE warm-up before a UE transitions from an OFF duration of the UE with respect to a radio frequency spectrum band to an ON duration of the UE with respect to the radio frequency spectrum band. When a UE operates in the OFF duration, the UE's main modem may be operated at a lower power level or turned off, and loops of the UE (e.g., automatic gain control (AGC) loops, time tracking loops (TTLs), frequency tracking loops (FTLs), channel estimation loops, or combinations thereof) may lose synchronization. When a UE is expected to be prepared to receive at the start of an ON duration, the UE may perform a warm-up procedure before transitioning from the OFF duration to the ON duration.

In some examples, an OFF duration and ON duration may be coordinated with a wireless network (e.g., with a network access device of the wireless network). In some examples, the OFF duration and ON duration may be part of a DRX cycle. In other examples, the OFF duration and ON duration may be coordinated with a wireless network (e.g., a network access device) in other ways. For example, the OFF duration may be dynamically signaled to the UE (e.g., by a network access device) or semi-statically configured. In some examples, the OFF duration may include a number of blank subframes in which one or more UEs are not expected to receive or transmit over a radio frequency spectrum band. One example of a blank subframe may be a subframe allocated for multicast-broadcast single-frequency network (MBSFN) service use in a LTE/LTE-A network, in which a MBSFN transmission may blank the subframe for delivery of downlink (DL) broadcast content to a number of UEs subscribed to the MBSFN service, and UEs not subscribed to the MBSFN service may not be required to receive reference signals or monitor DL control information during such a subframe.

To perform a warm-up procedure, a UE may need to process reference signals received from a network access device. Network access devices in some wireless communication systems (e.g., base stations or eNBs of Long Term Evolution (LTE) or LTE-Advanced (LTE-A) wireless communication systems) may transmit regular, periodic, reference signals (e.g., a cell-specific reference signal (CRS)) that a UE may use to perform its warm-up procedure. However, network access devices in other wireless communication systems (e.g., network access devices of 5G wireless communication systems) may not transmit regular, periodic, reference signals. For example, network access devices in some wireless communication systems (e.g., 5G wireless communication systems) may transmit reference signals "on demand," to individual UEs or groups of UEs. Thus, a UE may not have access to a reference signal during an OFF duration, and its ability to perform a warm-up procedure before transitioning from an OFF duration to an ON duration may be adversely impacted.

To enable UEs to perform warm-up procedures in wireless communication systems in which network access devices transmit "on demand" reference signals, a network access device and UE may agree to a transmission time, relative to a transition from an OFF duration to an ON duration, at which the network access device will transmit an "on demand" control reference signal that the UE can use when performing its warm-up procedure. The UE and the network access device may also agree to transmission times for other reference signals (e.g., an aperiodic channel state information reference signal (CSI-RS)) or other transmissions (e.g., a sounding reference signal (SRS), channel state information (CSI), or channel quality information (CQI)).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

FIG. 1 shows an example of a wireless communication system 100, in accordance with one or more aspects of the disclosure. The wireless communication system 100 may include network access devices 105 (e.g., eNBs 105-*a*, ANCs 105-*b*, and/or RHs 105-*c*), UEs 115, and a core network 130. The core network 130 may provide user authentication, access authorization, tracking, Internet Protocol (IP) connectivity, and other access, routing, or mobility functions. At least some of the network access devices 105 (e.g., eNBs 105-*a* or ANCs 105-*b*) may interface with the core network 130 through backhaul links 132 (e.g., S1, S2, etc.) and may perform radio configuration and scheduling for communication with the UEs 115. In various examples, the ANCs 105-*b* may communicate, either directly or indirectly (e.g., through core network 130), with each other over backhaul links 134 (e.g., X1, X2, etc.), which may be wired or wireless communication links. Each ANC 105-*b* may also communicate with a number of UEs 115 through a number of smart radio heads (e.g., RHs 105-*c*). In an alternative configuration of the wireless communication system 100, the functionality of an ANC 105-*b* may be provided by a radio head 105-*c* or distributed across the radio heads 105-*c* of an eNB 105-*a*. In another alternative configuration of the wireless communication system 100 (e.g., an LTE/LTE-A configuration), the radio heads 105-*c* may be replaced with base stations, and the ANCs 105-*b* may be replaced by base station controllers (or links to the core network 130). In some examples, the wireless communication system 100 may include a mix of radio heads 105-*c*, base stations, and/or other network access devices 105 for receiving/transmitting communications according to different radio access technologies (RATs) (e.g., LTE/LTE-A, 5G, Wi-Fi, etc.).

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the eNBs 105-*a* and/or radio heads 105-*c* may have similar frame timing, and transmissions from different eNBs 105-*a* and/or radio heads 105-*c* may be approximately aligned in time. For asynchronous operation, the eNBs 105-*a* and/or radio heads 105-*c* may have different frame timings, and transmissions from different eNBs 105-*a* and/or radio heads 105-*c* may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a radio head 105-*c*, ANC 105-*b*, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of Everything (IoE) device, etc. A UE 115 may be able to communicate with various types of eNBs 105-*a*, radio heads 105-*c*, base stations, access points, or other network access devices, including macro eNBs, small cell eNBs, relay base stations, and the like. A UE 115 may also be able to communicate directly with other UEs 115 (e.g., using a peer-to-peer (P2P) protocol).

The communication links 125 shown in wireless communication system 100 may include uplinks (ULs) from a UE 115 to a radio head 105-*c*, and/or downlinks (DLs), from a radio head 105-*c* to a UE 115. The downlinks may also be called forward links, while the uplinks may also be called reverse links. Control information and data may be multiplexed on an uplink or downlink according to various techniques. Control information and data may be multiplexed on an uplink or downlink, for example, using TDM techniques, FDM techniques, or hybrid TDM-FDM techniques.

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing techniques (e.g., using unpaired spectrum resources). Frame structures for FDD (e.g., frame structure type 1) and TDD (e.g., frame structure type 2) may be defined.

In some examples of the wireless communication system 100, network access devices 105 (e.g., radio heads 105-c) and UEs 115 may include multiple antennas for employing antenna diversity schemes to improve communication quality and reliability between network access devices 105 and UEs 115. Additionally or alternatively, network access devices and UEs 115 may employ multiple-input, multiple-output (MIMO) techniques that may take advantage of multi-path environments to transmit multiple spatial layers carrying the same or different coded data. In some cases, signal processing techniques such as beamforming (i.e., directional transmission) may be used with MIMO techniques to coherently combine signal energies and overcome the path loss in specific beam directions. Precoding (e.g., weighting transmissions on different paths or layers, or from different antennas) may be used in conjunction with MIMO or beamforming techniques.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some examples, a UE 115 may include a wireless communication manager 820. The wireless communication manager 820 may be used to identify a transmission timing of a control reference signal transmitted over a radio frequency spectrum band during an OFF duration of the UE 115 with respect to the radio frequency spectrum band, in which the identified transmission timing is relative to a transition from the OFF duration to an ON duration of the UE 115 with respect to the radio frequency spectrum band; receive the control reference signal at the identified transmission timing; and perform a warm-up procedure, before the ON duration, based at least in part on the identified transmission timing of the control reference signal. The OFF duration and the ON duration may be coordinated with a wireless network (e.g., with a network access device 105).

In some examples, one or a combination of network access devices 105 may include a wireless communication manager 1020. The wireless communication manager 1020 may be used to indicate, to a UE 115, a transmission timing of a control reference signal transmitted over a radio frequency spectrum band during an OFF duration of the UE 115 with respect to the radio frequency spectrum band, in which the indicated transmission timing is relative to a transition from the OFF duration to an ON duration of the UE with respect to the radio frequency spectrum band; and transmit the control reference signal at the indicated transmission timing. The OFF duration and the ON duration may be coordinated between the UE 115 and a wireless network (e.g., between the UE 115 and a network access device 105).

Figure 2:
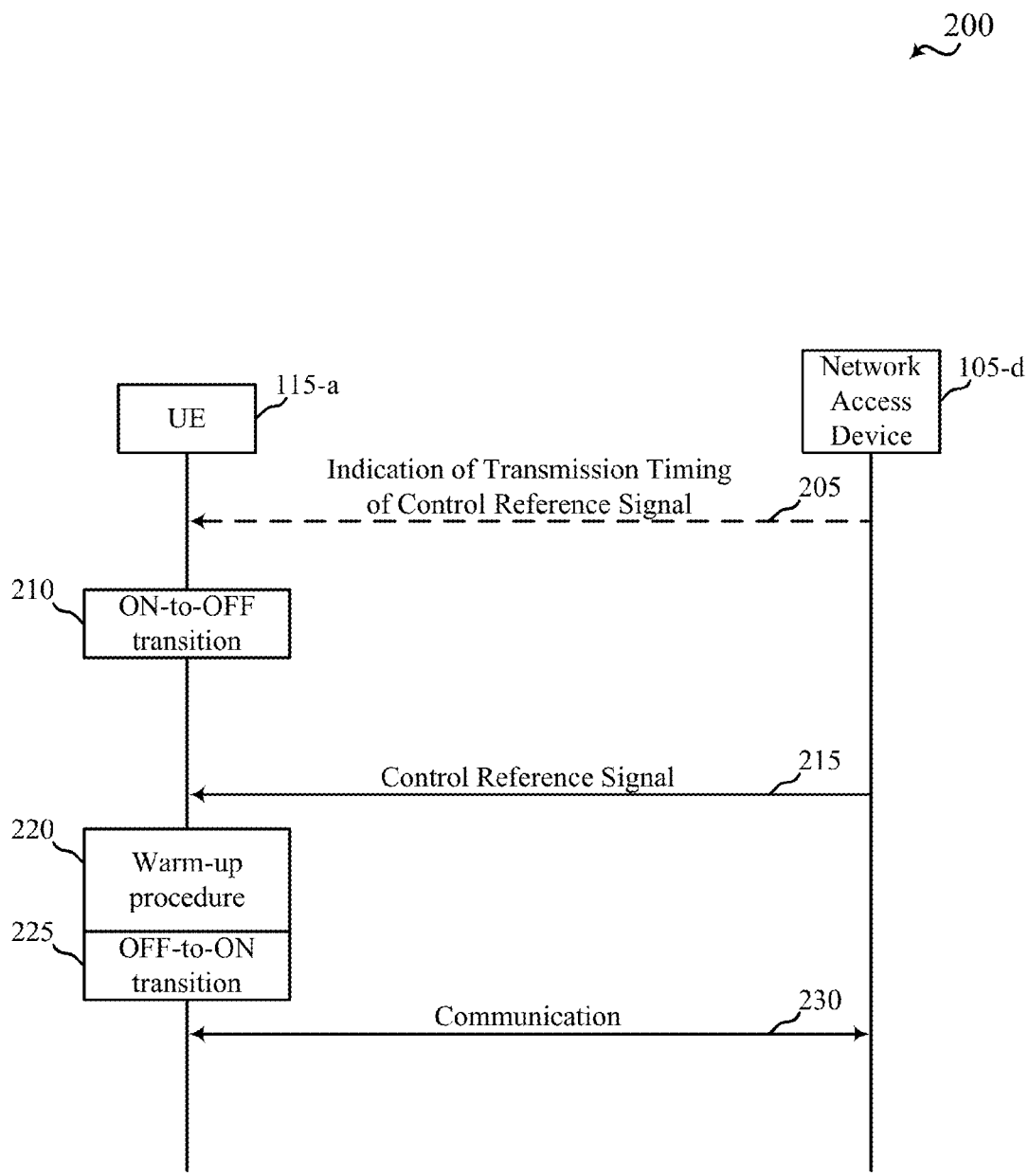
FIG. 2 shows a message flow between a UE and a network access device during ON and OFF durations of a DRX cycle, in accordance with one or more aspects of the present disclosure.

FIG. 2 shows a message flow 200 between a UE 115-a and a network access device 105-d during ON and OFF durations of a DRX cycle, in accordance with one or more aspects of the present disclosure. The UE 115-a may be an example of aspects of the UEs 115 described with reference to FIG. 1, and the network access device 105-d may be an example of aspects of the network access devices 105 described with reference to FIG. 1.

While operating in accordance with a DRX cycle (e.g., an RRC_IDLE DRX (I-DRX) cycle or an RRC_CONNECTED DRX (C-DRX) cycle), the UE 115-a may transition from an ON duration of the DRX cycle to an OFF duration of the DRX cycle (i.e., complete an ON-to-OFF DRX transition) at 210. Subsequently, the UE 115-a may transition from the OFF duration of the DRX cycle to the ON duration of the DRX cycle (i.e., complete an OFF-to-ON DRX transition) at 225. At the end of the ON duration of the DRX cycle, the UE 115-a may complete another ON-to-OFF DRX transition, and so on.

Prior to the ON-to-OFF DRX transition at 210, and in some cases prior to operating in accordance with the DRX cycle, the UE 115-a may receive, at 205, an indication of a semi-static configuration of a transmission timing of a control reference signal transmitted during an OFF duration of a DRX cycle. In some examples, the indication of the semi-static configuration of the transmission timing may be received in at least one of system information, RRC signaling, or a combination thereof (e.g., in system information or RRC signaling transmitted by the network access device 105-d). Alternatively, the UE 115-a may be preconfigured with an indication of a transmission timing of a control reference signal transmitted during an OFF duration of a DRX cycle.

The transmission timing of a control reference signal transmitted during an OFF duration of a DRX cycle may be relative to a transition from the OFF duration of the DRX cycle to an ON duration of the DRX cycle. The transmission timing may be relative because in some wireless communication systems (e.g., 5G wireless communication systems) reference signals may be transmitted from network access devices to a UE (or group of UEs) "on demand," and may not be broadcast to all of the UEs within the coverage area of a cell. Thus, a UE may not be able to awake at a given periodic time and receive a regularly broadcast reference signal, and an event may be needed to trigger the transmission of a reference signal. A control reference signal transmitted during an OFF duration of a DRX cycle may therefore be triggered by a transmission time that is a predetermined number of subframes or other transmission time intervals (TTIs) before the commencement of an ON duration of a DRX cycle.

At 215, during the OFF duration of the DRX cycle, the network access device 105-d may transmit the control reference signal to the UE 115-a in accordance with its transmission timing relative to the OFF-to-ON DRX transition at 225.

At 220, before the OFF-to-ON DRX transition at 225, the UE 115-a may perform a warm-up procedure based at least in part on the identified transmission timing of the control reference signal. The warm-up procedure may include, for example, a wake-up of the UE's main modem and the performance of a radio frequency (RF) warm-up, or a baseband warm-up (e.g., an AGC wake-up, a TTL warm-up, a FTL warm-up, channel estimation, etc.), or a combination thereof.

At 230, after the warm-up procedure at 220 and the OFF-to-ON DRX transition at 225, the UE 115-a and network access device 105-d may communicate with one another during the ON duration of the DRX cycle.

Figure 3:
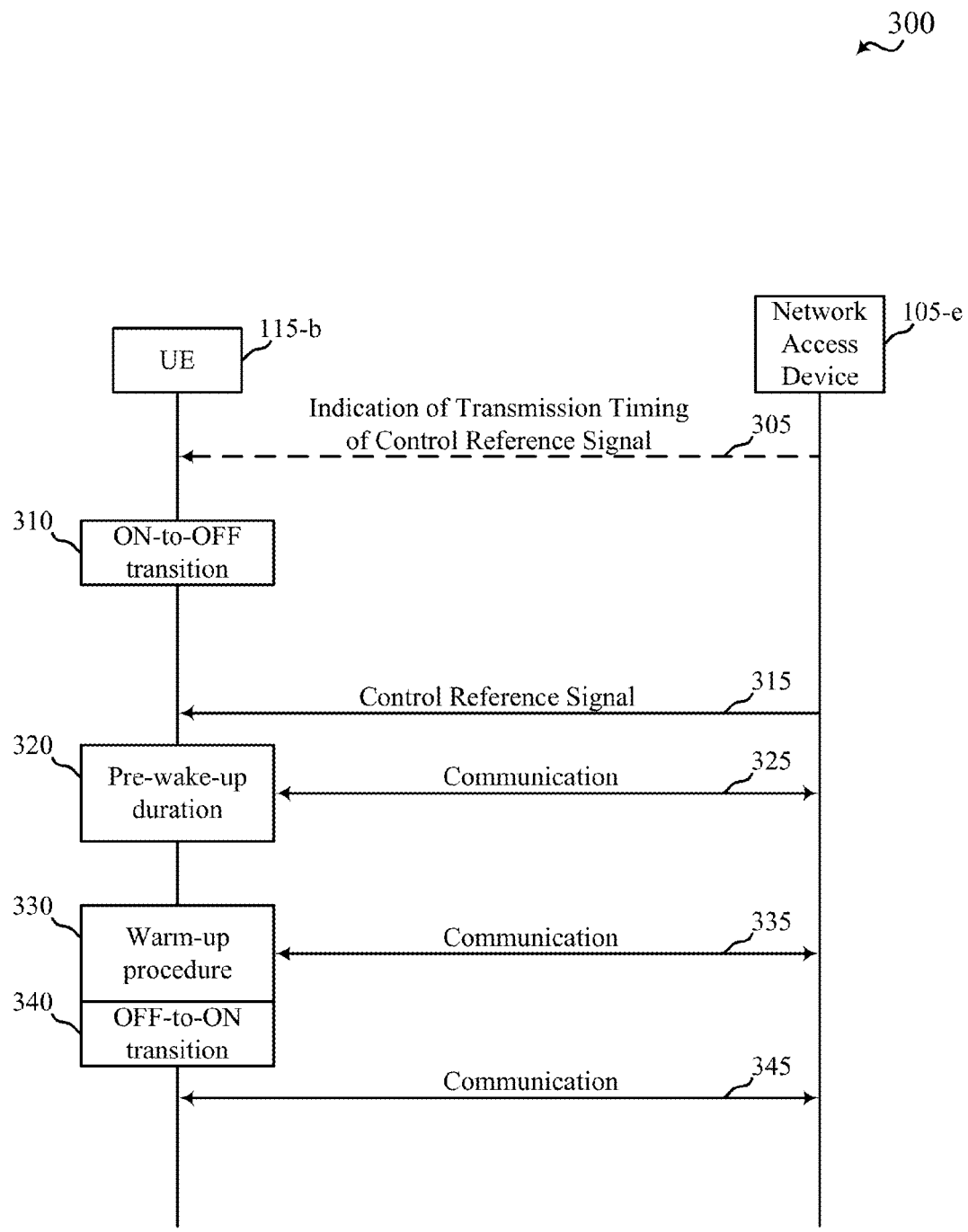
FIG. 3 shows a message flow between a UE and a network access device during ON and OFF durations of a DRX cycle, in accordance with one or more aspects of the present disclosure.

FIG. 3 shows a message flow 300 between a UE 115-b and a network access device 105-e during ON and OFF durations of a DRX cycle, in accordance with one or more aspects of the present disclosure. The UE 115-b may be an example of aspects of the UEs 115 described with reference to FIG. 1 or 2, and the network access device 105-e may be an example of aspects of the network access devices 105 described with reference to FIG. 1 or 2.

While operating in accordance with a DRX cycle (e.g., an RRC_IDLE DRX (I-DRX) cycle or an RRC_CONNECTED DRX (C-DRX) cycle), the UE 115-b may transition from an ON duration of the DRX cycle to an OFF duration of the DRX cycle (i.e., complete an ON-to-OFF DRX transition) at 310. Subsequently, the UE 115-b may transition from the OFF duration of the DRX cycle to the ON duration of the DRX cycle (i.e., complete an OFF-to-ON DRX transition) at 340. At the end of the ON duration of the DRX cycle, the UE 115-b may complete another ON-to-OFF DRX transition, and so on.

Prior to the ON-to-OFF DRX transition at 310, and in some cases prior to operating in accordance with the DRX cycle, the UE 115-b may receive, at 305, an indication of a semi-static configuration of a transmission timing of a control reference signal transmitted during an OFF duration of a DRX cycle. In some examples, the indication of the semi-static configuration of the transmission timing may be received in at least one of system information, or RRC signaling, or a combination thereof (e.g., in system information or RRC signaling transmitted by the network access device 105-e). Alternatively, the UE 115-b may be preconfigured with an indication of a transmission timing of a control reference signal transmitted during an OFF duration of a DRX cycle. The transmission timing of a control reference signal transmitted during an OFF duration of a DRX cycle may be relative to a transition from the OFF duration of the DRX cycle to an ON duration of the DRX cycle. In some examples, the transmission timing of a control reference signal may also be relative to a pre-wake-up duration, which pre-wake-up duration may have a timing relative to the transition from the OFF duration of the DRX cycle to the ON duration of the DRX cycle.

At 315, during the OFF duration of the DRX cycle, the network access device 105-e may transmit the control reference signal to the UE 115-b in accordance with its transmission timing relative to the OFF-to-ON DRX transition at 340.

At 320, the UE 115-b may communicate with the network access device 105-e during a pre-wake-up duration. The pre-wake-up duration may be scheduled prior to the UE 115-b making the ON-to-OFF DRX transition at 310, and in some examples may be scheduled relative to the OFF-to-ON DRX transition 340. The pre-wake-up duration may occur between the transmission timing of the control reference signal, at 315, and the ON duration of the DRX cycle, at 340. During the pre-wake-up duration, the UE 115-b may communicate with the network access device 105-e (e.g., at 325). The communications may include one or more transmissions from the network access device 105-e to the UE 115-b on a downlink, and one or more transmissions from the UE 115-b to the network access device 105-e on an uplink.

In some examples, the network access device 105-e may transmit to the UE 115-b, during the pre-wake-up duration, information including an indication of an aperiodic CSI-RS transmission timing. The aperiodic CSI-RS transmission timing may be between the pre-wake-up duration, at 320, and the ON duration of the DRX cycle, at 340. In some examples, the UE 115-b may receive the CSI-RS transmission timing in downlink control information (DCI) received from the network access device 105-e. In some examples, the aperiodic CSI-RS transmission timing may be during the warm-up procedure 330, and the network access device 105-e may transmit the aperiodic CSI-RS to the UE 115-b at 335. In some examples, the aperiodic CSI-RS may be used by the UE 115-b for TTL or FTL training, for generation of aperiodic CSI or CQI, etc. In some examples, the information transmitted from the network access device 105-e to the UE 115-b during the pre-wake-up duration may also include other timing information or scheduling information, such as the frequency tone location or resource element or resource block allocation for the transmission.

In some examples, the network access device 105-e may transmit to the UE 115-b, during the pre-wake-up duration, a transmission request. The transmission request may be associated with a transmission by the UE before the ON duration of the DRX cycle. The transmission request may be associated with a transmission timing, and in some examples, an indication of the transmission timing may be received during the pre-wake-up duration. In some examples, the UE 115-b may receive the transmission request and/or transmission timing in DCI received from the network access device 105-e. In some examples, the transmission timing may be during the warm-up procedure 330, and the UE 115-b may transmit to the network access device 105-e in accordance with the transmission request at 335. In some examples, the UE's transmission(s) at 335 may include at least one of aperiodic CSI, or an SRS (e.g., for TDD reciprocity), or CQI, or a combination thereof. The network access device 105-e may receive these transmissions and use them, for example, to make at least one scheduling decision for the UE 115-b, and/or to make a modulation and coding scheme (MCS)/precoder selection for the UE 115-b.

At 330, before the OFF-to-ON DRX transition at 340, the UE 115-b may perform a warm-up procedure based at least in part on the identified transmission timing of the control reference signal, and based at least in part on the communications at 325 and/or 335. The warm-up procedure may include, for example, a wake-up of the UE's main modem and the performance of an RF warm-up, or a baseband warm-up (e.g., an AGC wake-up, a TTL warm-up, a FTL warm-up, channel estimation, etc.), or a combination thereof.

At 345, after the warm-up procedure at 330 and the OFF-to-ON DRX transition at 340, the UE 115-b and network access device 105-e may communicate with one another during the ON duration of the DRX cycle.

Figure 4:
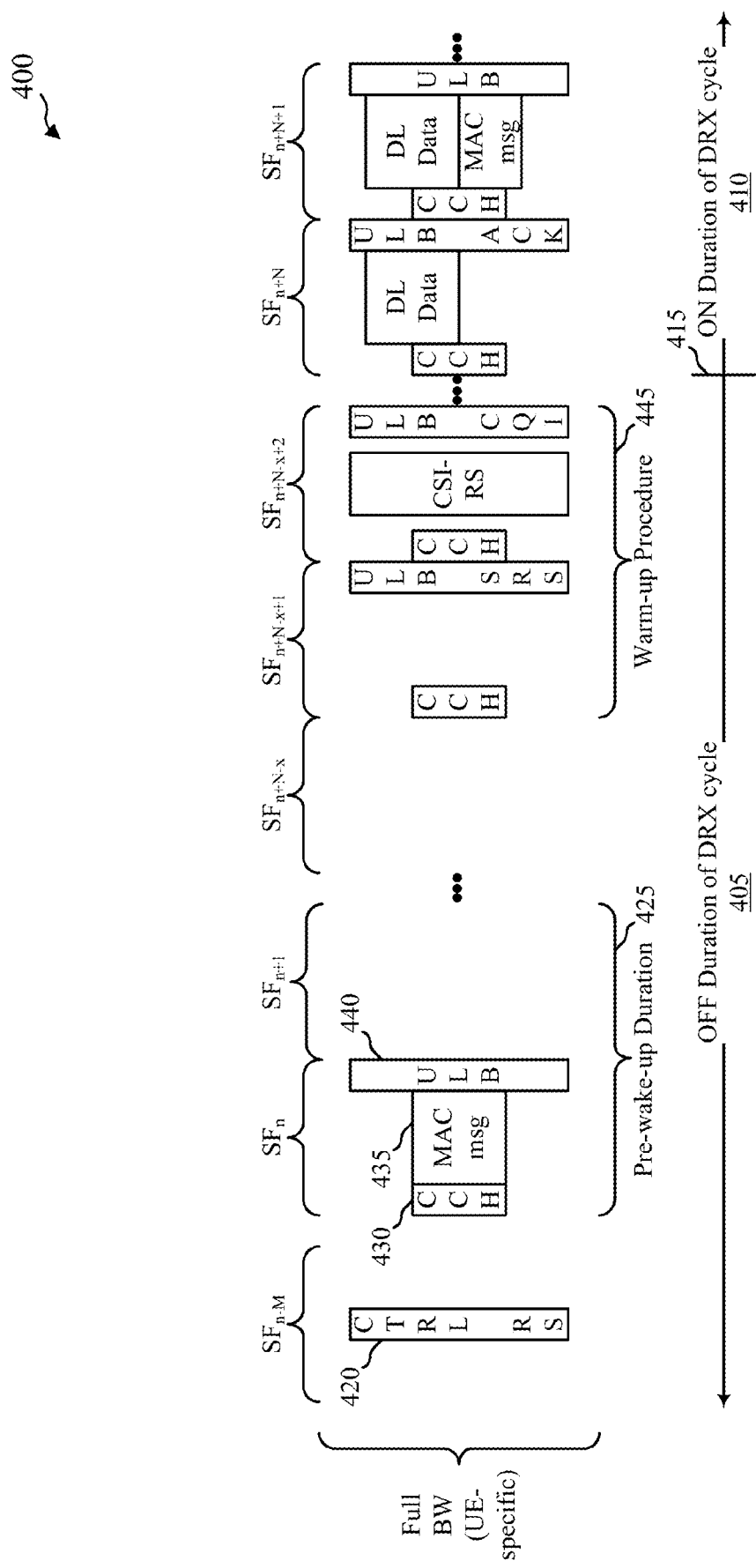
FIG. 4 shows a timeline of communications between a UE and a network access device during OFF and ON durations of a DRX cycle, in accordance with one or more aspects of the present disclosure.

FIG. 4 shows a timeline 400 of communications between a UE and a network access device during OFF and ON durations of a DRX cycle, in accordance with one or more aspects of the present disclosure. The UE may be an example of aspects of the UEs 115 described with reference to FIG. 1, 2, or 3, and the network access device may be an example of aspects of the network access devices 105 described with reference to FIG. 1, 2, or 3.

In a subframe n–M ($SF_{n-M}$), during an OFF duration 405 of a DRX cycle, the network access device may transmit a control reference signal 420 to the UE, as described with reference to FIG. 1, 2, or 3. The control reference signal 420 may have a transmission timing relative to a transition 415 from the OFF duration 405 of the DRX cycle to an ON duration 410 of the DRX cycle.

The network access device may schedule a pre-wake-up duration 425 during the OFF duration 405 of the DRX cycle. The pre-wake-up duration 425 may be scheduled relative to the transition 415. By way of example, the pre-wake-up duration 425 is scheduled during subframes $SF_n$ and $SF_{n+1}$. During the pre-wake-up duration 425, the network access device and UE may communicate as described with reference to FIG. 3. In some examples, the communications may include the transmission of a control channel (CCH) 430 (e.g., a physical downlink control channel (PDCCH)) from the network access device to the UE. The control channel may include, for example, DCI including an aperiodic CSI-RS transmission timing, and one or more transmission requests (and transmission timings) for aperiodic CSI, SRS, or CQI transmissions by the UE. In some examples, the communications during the pre-wake-up duration 425 may also include a MAC message (msg) 435 transmitted by the network access device and/or an uplink burst (ULB) 440 transmitted by the UE. In some examples, the MAC message 435 may include or resemble a page indicator channel (PICH). In some examples, the ULB 440 may include a scheduling request (SR). In some examples, some or all of the transmissions received by the UE during the pre-wake-up duration 425 may be processed offline, and the UE may return to a sleep state following the pre-wake-up duration 425.

The UE may perform a warm-up procedure during the OFF duration 405, during a time period 445 (e.g., during subframes $SF_{n+N-x+1}$ and $SF_{n+N-x+2}$). In some examples, the warm-up procedure may be performed near, or just before, the transition 415. In some examples, the UE may receive one or more CCH transmissions and an aperiodic CSI-RS from the network access device during the warm-up procedure, and the UE may make one or more transmissions to the network access device (e.g., an SRS, aperiodic CSI, or CQI transmission). As part of the warm-up procedure, the UE may wake its main modem and perform an RF warm-up, or a baseband warm-up (e.g., an AGC wake-up, a TTL warm-up, a FTL warm-up, channel estimation, etc.), or a combination thereof.

Following its performance of the warm-up procedure, the UE may transition from the OFF duration 405 of the DRX cycle to the ON duration 410 of the DRX cycle at 415 (e.g., at the beginning of a subframe $SF_{n+N}$). In some examples, the UE may receive over less than its full bandwidth prior to the transition 415, and receive over its full bandwidth after the transition 415. In some examples, the UE may activate or reset an inactivity timer (for re-entering an OFF duration of the DRX cycle) in response to the transition 415.

Figure 5:
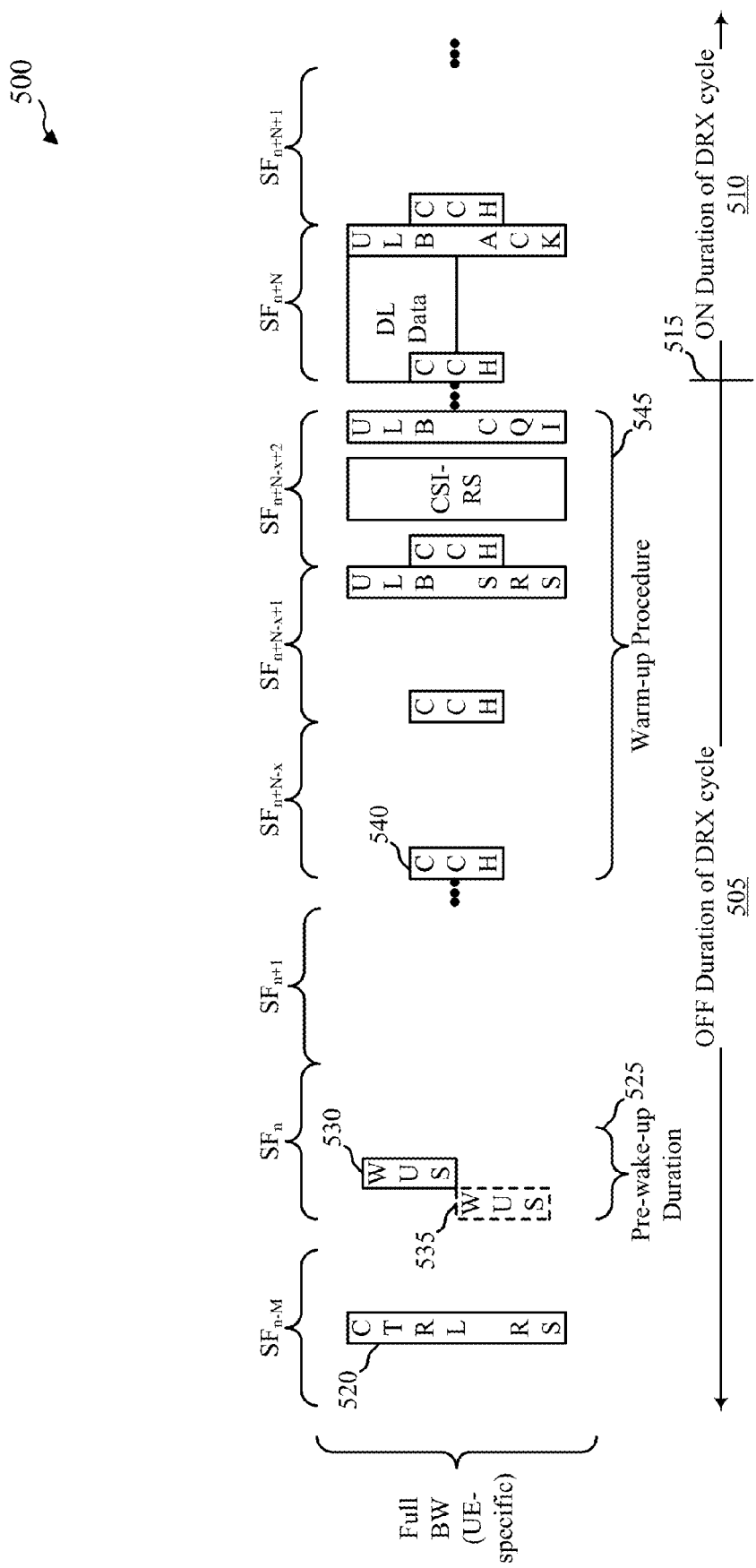
FIG. 5 shows a timeline of communications between a UE and a network access device during OFF and ON durations of a DRX cycle, in accordance with one or more aspects of the present disclosure.

FIG. 5 shows a timeline 500 of communications between a UE and a network access device during OFF and ON durations of a DRX cycle, in accordance with one or more aspects of the present disclosure. The UE may be an example of aspects of the UEs 115 described with reference to FIG. 1, 2, or 3, and the network access device may be an example of aspects of the network access devices 105 described with reference to FIG. 1, 2, or 3.

In a subframe n-M ($SF_{n-M}$), during an OFF duration 505 of a DRX cycle, the network access device may transmit a control reference signal 520 to the UE, as described with reference to FIG. 1, 2, or 3. The control reference signal 520 may have a transmission timing relative to a transition 515 from the OFF duration 505 of the DRX cycle to an ON duration 510 of the DRX cycle.

The network access device may schedule a pre-wake-up duration 525 during the OFF duration 505 of the DRX cycle. The pre-wake-up duration 525 may be scheduled relative to the transition 515. By way of example, the pre-wake-up duration 525 is scheduled during subframes $SF_n$. During the pre-wake-up duration 525, the network access device may transmit a wake-up signal (WUS) 530 or 535 to the UE. The WUS 530 or 535 may be detectable, by the UE, based on a simplified receiver algorithm (e.g., a non-coherent detection algorithm), which simplified receiver algorithm may not depend on the control reference signal 520. Therefore, transmission of the control reference signal 520 may be optional.

The UE may perform a warm-up procedure during the OFF duration 505, during a time period 545 (e.g., during subframes $SF_{n+N-x+1}$ and $SF_{n+N-x+2}$). In some examples, the warm-up procedure may be performed near, or just before, the transition 515. In some examples, the UE may receive one or more CCH transmissions and an aperiodic CSI-RS from the network access device during the warm-up procedure, and the UE may make one or more transmissions to the network access device (e.g., an SRS, aperiodic CSI, or CQI transmission). In some examples, the network access device may transmit a CCH 540 (e.g., a PDCCH) to the UE in subframe $SF_{n+N-x}$ and/or $SF_{n+N-x+1}$. The CCH may include, for example, DCI including an aperiodic CSI-RS transmission timing, and one or more transmission requests (and transmission timings) for aperiodic CSI, SRS, or CQI transmissions by the UE. As part of the warm-up procedure, the UE may wake its main modem and perform an RF warm-up, or a baseband warm-up (e.g., an AGC wake-up, a TTL warm-up, a FTL warm-up, channel estimation, etc.), or a combination thereof. CCH 540 may also include a reference signal usable for demodulation and decoding of the CCH 540.

Following its performance of the warm-up procedure, the UE may transition from the OFF duration 505 of the DRX cycle to the ON duration 510 of the DRX cycle at 515 (e.g., at the beginning of a subframe $SF_{n+N}$). In some examples, the UE may receive over less than its full bandwidth prior to the transition 515, and receive over its full bandwidth after the transition 515. In some examples, the UE may activate or reset an inactivity timer (for re-entering an OFF duration of the DRX cycle) in response to the transition 515.

Figure 6:
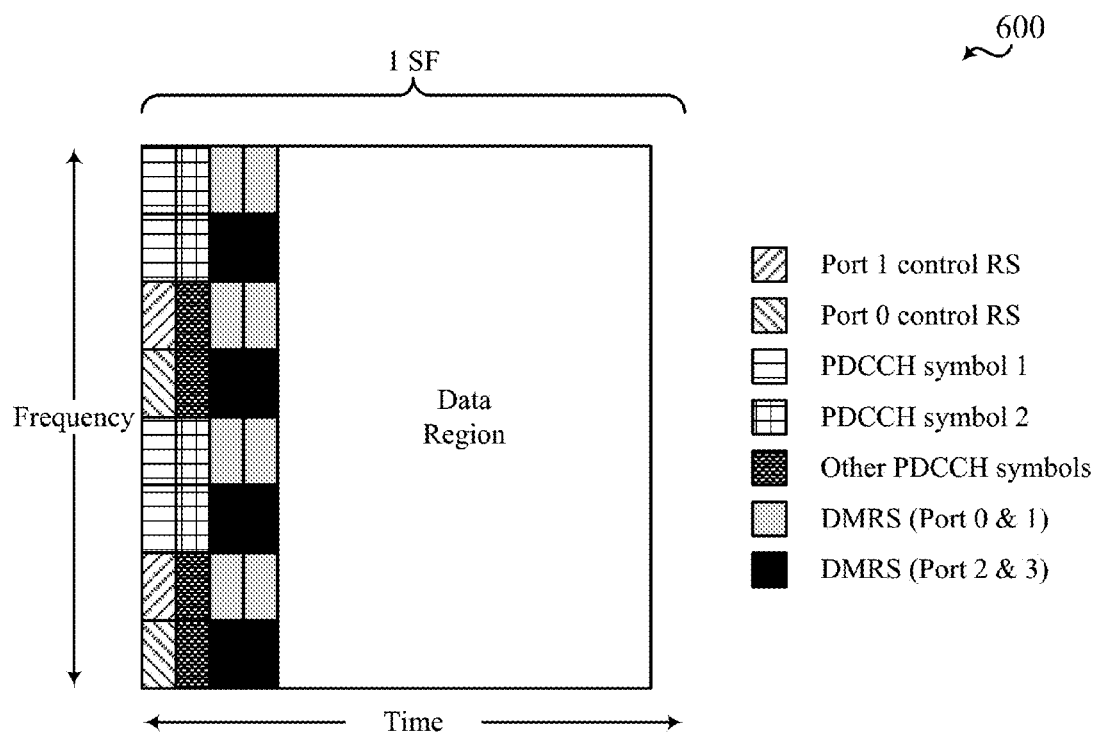
FIG. 6 shows a time-frequency grid of a resource block of a subframe (or TTI), in accordance with one or more aspects of the present disclosure.

FIG. 6 shows a time-frequency grid of a resource block 600 of a subframe (or TTI), in accordance with one or more aspects of the present disclosure. The resource block 600 or subframe may be transmitted from a network access device to a UE during an ON duration of a DRX cycle. The UE may be an example of aspects of the UEs 115 described with reference to FIG. 1, 2, or 3, and the network access device may be an example of aspects of the network access devices 105 described with reference to FIG. 1, 2, or 3.

The resource block 600 may include a control region and a data region. The control region may include transmissions of control reference signals (e.g., control reference signals for an antenna port 0 and an antenna port 1), a control channel (e.g., a PDCCH symbol1 and a PDCCH symbol 2), other control channel symbols (e.g., other PDCCH symbols), and DMRS (e.g., a DMRS for antenna ports 0 & 1, and a DMRS for antenna ports 2 & 3). As shown, and in some examples, time-division multiplexing (TDM) may be used for transmissions within the control region.

Figure 7:
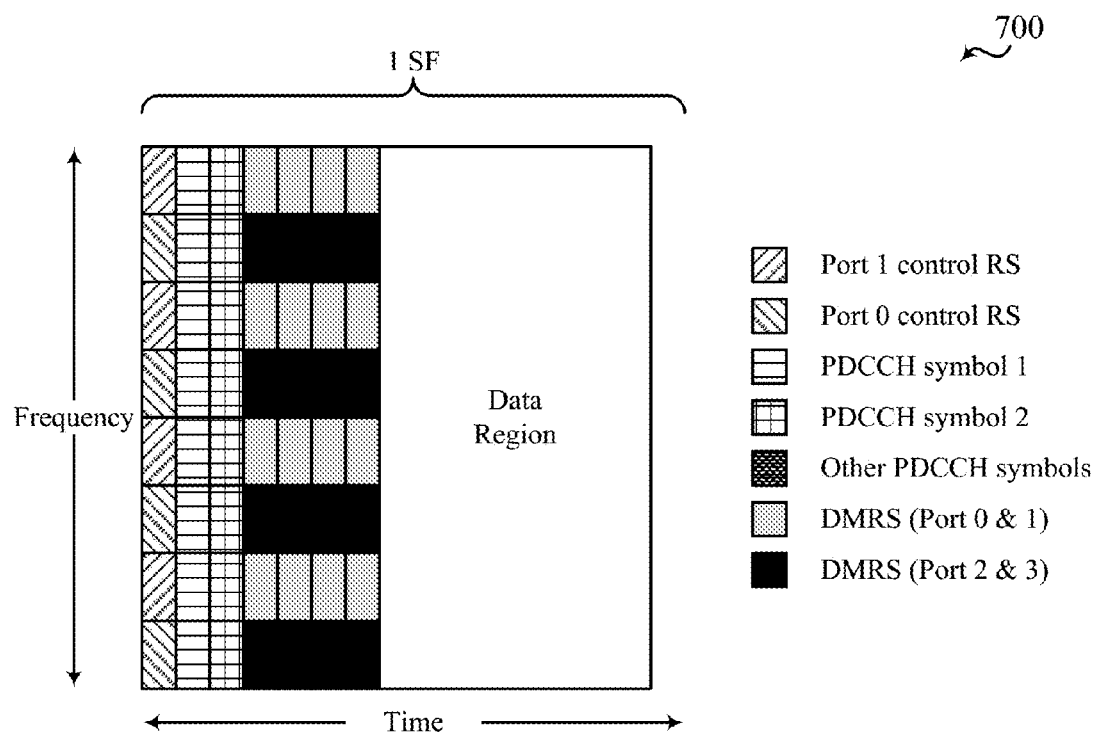
FIG. 7 shows a time-frequency grid of a resource block of a subframe (or TTI), in accordance with one or more aspects of the present disclosure.

FIG. 7 shows a time-frequency grid of a resource block 700 of a subframe (or TTI), in accordance with one or more aspects of the present disclosure. The resource block 700 or subframe may be transmitted from a network access device to a UE during an ON duration of a DRX cycle after an OFF duration (which may also include one or more blank subframes). The UE may be an example of aspects of the UEs 115 described with reference to FIG. 1, 2, or 3, and the network access device may be an example of aspects of the network access devices 105 described with reference to FIG. 1, 2, or 3.

The resource block 700 may include a control region and a data region. The control region may include transmissions of control reference signals (e.g., control reference signals for an antenna port 0 and an antenna port 1), a control channel (e.g., a PDCCH symbol1 and a PDCCH symbol 2), other control channel symbols (e.g., other PDCCH symbols), and DMRS (e.g., a DMRS for antenna ports 0 & 1, and a DMRS for antenna ports 2 & 3). As shown, and in some examples, TDM may be used for transmissions within the control region.

In contrast to the resource block 600 described with reference to FIG. 6, the resource block 700 may have a higher density of reference signals. For example, and as shown, the temporally first symbol period of the resource block 700 may have twice the density of control reference signals compared to the temporally first symbol period of the resource block 600. Additionally or alternatively, the resource block 700 may have twice the density of DMRS compared to the resource block 600. In some examples, a type of reference signal (e.g., DMRS) may be more front-loaded in the resource block 700 than in the resource block 600.

In some examples, one or more resource blocks having a higher density of at least one type of reference signal may be transmitted in one or more initial subframes (or early subframes or TTIs) of an ON duration of a DRX cycle, to help a UE complete a warm-up procedure faster, and one or more resource blocks having a lower density of at least one type of reference signal may be transmitted in one or more later subframes of the ON duration of the DRX cycle. In some cases, the high density/low density transmission of reference signals may be configured semi-statically. In other cases, a network access device may blindly search for and detect changes in density in reference signals. In some examples, a DMRS pattern/density can be dynamically signaled in a PDCCH.

Figure 8:
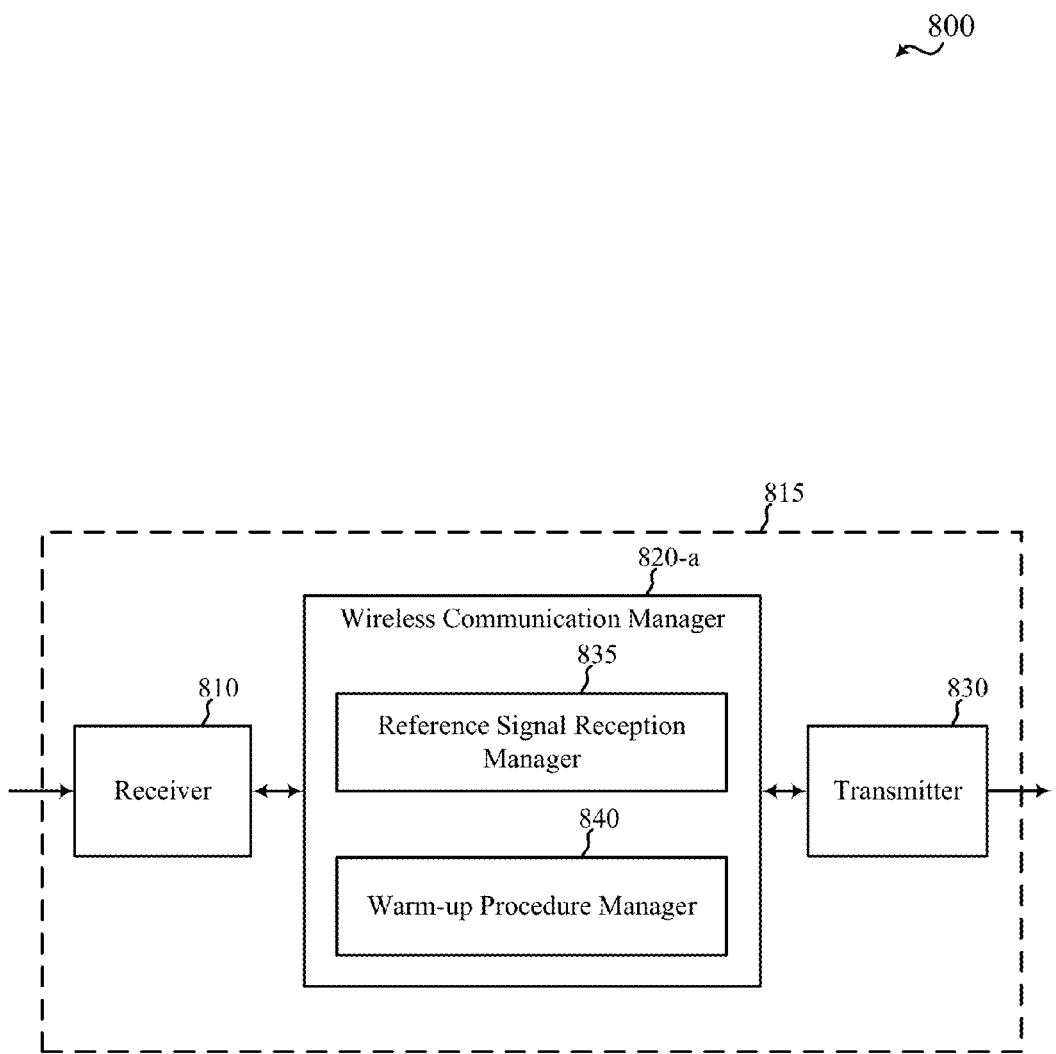
FIG. 8 shows a block diagram of an apparatus for use in wireless communication, in accordance with one or more aspects of the present disclosure.

FIG. 8 shows a block diagram 800 of an apparatus 815 for use in wireless communication, in accordance with one or more aspects of the present disclosure. The apparatus 815 may be an example of aspects of one or more of the UEs 115 described with reference to FIG. 1, 2, or 3. The apparatus 815 may also be or include a processor. The apparatus 815 may include a receiver 810, a wireless communication manager 820-a, or a transmitter 830. Each of these components may be in communication with each other.

The components of the apparatus 815 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 810 may include at least one radio frequency (RF) receiver, such as at least one RF receiver operable to receive transmissions over one or more radio frequency spectrum bands. In some examples, the one or more radio frequency spectrum bands may be used for communicating as described with reference to FIG. 1, 2, 3, 4, 5, 6, or 7. The receiver 810 may be used to receive various types of data or control signals (i.e., transmissions) over one or more communication links of a wireless communication system, such as one or more communication links of the wireless communication system 100 described with reference to FIG. 1.

In some examples, the transmitter 830 may include at least one RF transmitter, such as at least one RF transmitter operable to transmit over one or more radio frequency spectrum bands. In some examples, the one or more radio frequency spectrum bands may be used for communicating as described with reference to FIG. 1, 2, 3, 4, 5, 6, or 7. The transmitter 830 may be used to transmit various types of data or control signals (i.e., transmissions) over one or more communication links of a wireless communication system, such as one or more communication links of the wireless communication system 100 described with reference to FIG. 1.

In some examples, the wireless communication manager 820-a may be used to manage one or more aspects of wireless communication for the apparatus 815. In some examples, part of the wireless communication manager 820-a may be incorporated into or shared with the receiver 810 or the transmitter 830. In some examples, the wireless communication manager 820-a may be an example of aspects of the wireless communication manager 820 described with reference to FIG. 1. In some examples, the wireless communication manager 820-a may include a reference signal reception manager 835 or a warm-up procedure manager 840.

The reference signal reception manager 835 may be used to identify a transmission timing of a control reference signal transmitted over a radio frequency spectrum band during an OFF duration of the apparatus 815 with respect to the radio frequency spectrum band. The identified transmission timing may be relative to a transition from the OFF duration to an ON duration of the apparatus 815 with respect to the radio frequency spectrum band. The OFF duration and the ON duration may be coordinated with a wireless network (e.g., with a network access device of the wireless network). In some examples, the OFF duration and the ON duration may be part of a DRX cycle. The reference signal reception manager 835 may also be used to receive the control reference signal at the identified transmission timing. The warm-up procedure manager 840 may be used to perform a warm-up procedure, before the ON duration of the, based at least in part on the identified transmission timing of the control reference signal.

Figure 9:
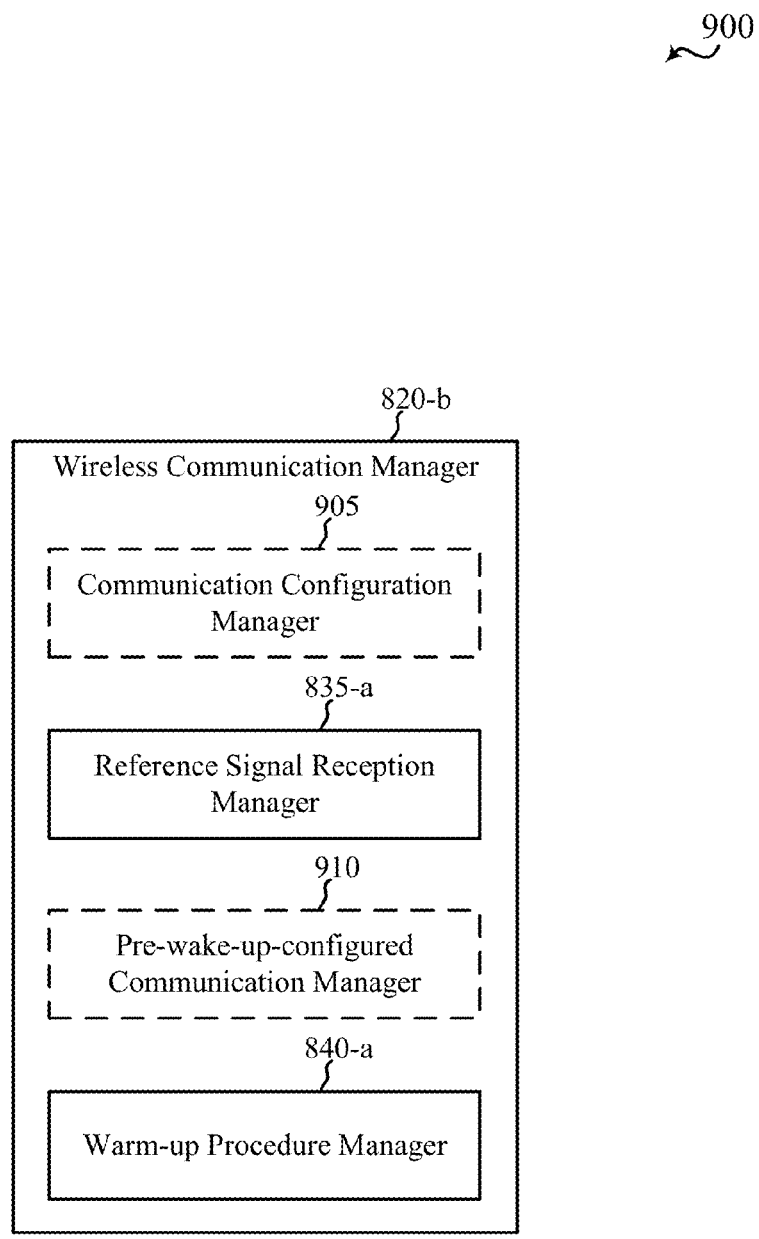
FIG. 9 shows a block diagram of a wireless communication manager for use in wireless communication, in accordance with one or more aspects of the present disclosure.

FIG. 9 shows a block diagram 900 of a wireless communication manager 820-b for use in wireless communication, in accordance with one or more aspects of the present disclosure. The wireless communication manager 820-b may be an example of aspects of the wireless communication manager 820 described with reference to FIG. 1 or 8.

The components of the wireless communication manager 820-b may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 820-*b* may be used to manage one or more aspects of wireless communication for a UE or apparatus, such as one of the UEs 115 or apparatuses 815 described with reference to FIG. 1, 2, 3, or 8. In some examples, part of the wireless communication manager 820-*b* may be incorporated into or shared with a receiver or a transmitter (e.g., the receiver 810 or the transmitter 830 described with reference to FIG. 8). In some examples, the wireless communication manager 820-*b* may include an optional communication configuration manager 905, a reference signal reception manager 835-*a*, an optional pre-wake-up-configured communication manager 910, or a warm-up procedure manager 840-*a*.

The communication configuration manager 905 may be used to receive an indication of a semi-static configuration of a transmission timing of a control reference signal transmitted over a radio frequency spectrum band during an OFF duration of an apparatus (e.g., a UE) including the wireless communication manager 820-*b*, with respect to the radio frequency spectrum band. The transmission timing may be relative to a transition from the OFF duration to an ON duration of the apparatus with respect to the radio frequency spectrum band. In some examples, the indication of the semi-static configuration of the transmission timing may be received in at least one of system information (e.g., in a MIB or a SIB), or RRC signaling, or a combination thereof. The OFF duration and the ON duration may be coordinated with a wireless network (e.g., with a network access device of the wireless network). In some examples, the OFF duration and the ON duration may be part of a DRX cycle.

The reference signal reception manager 835-*a* may be used to identify a transmission timing of a control reference signal transmitted during the OFF duration. In some examples, the transmission timing may be identified based at least in part on an indication received by the communication configuration manager 905.

In some examples, the pre-wake-up-configured communication manager 910 may be used to receive, during a pre-wake-up duration between the transmission timing of the control reference signal and the ON duration, an indication of an aperiodic CSI-RS transmission timing. The aperiodic CSI-RS transmission timing may be between the pre-wake-up duration and the ON duration. The pre-wake-up-configured communication manager 910 may also be used to receive an aperiodic CSI-RS in accordance with the aperiodic CSI-RS transmission timing.

In some examples, the pre-wake-up-configured communication manager 910 may be used to receive a transmission request during a pre-wake-up duration between the transmission timing of the control reference signal and the ON duration. The transmission request may be associated with a transmission by the UE before the ON duration. In some examples, the transmission request may be associated with a second transmission timing, and an indication of the second transmission timing may be received during the pre-wake-up duration. In some examples, the transmission request may include at least one of an aperiodic CSI transmission request, or an SRS transmission request, or a CQI transmission request, or a combination thereof. The pre-wake-up-configured communication manager 910 may also be used to transmit, before the ON duration and based at least in part on the transmission request, at least one of aperiodic CSI, or an SRS, or CQI, or a combination thereof.

The warm-up procedure manager 840-*a* may be used to perform a warm-up procedure, before the ON duration, based at least in part on the identified transmission timing of the control reference signal. In some examples, the warm-up procedure may also be performed based on a received aperiodic CSI-RS.

In some examples, the reference signal reception manager 835-*s* may be further used to receive, in a first TTI (e.g., symbol period or subframe) of the ON duration, a first instance of a type of reference signal. The first instance of the type of reference signal may have a higher density than a second instance of the type of reference signal, which second instance of the type of reference signal may be received in a second TTI having a later timing than the first TTI. In some examples, the higher density may include at least one of a first higher density in time, or a second higher density in frequency, or a combination thereof. In some examples, the type of reference signal may include a DMRS, a control reference signal, or a combination thereof. The first TTI may be the temporally first TTI of the ON duration or a later TTI of the ON duration.

Figure 10:
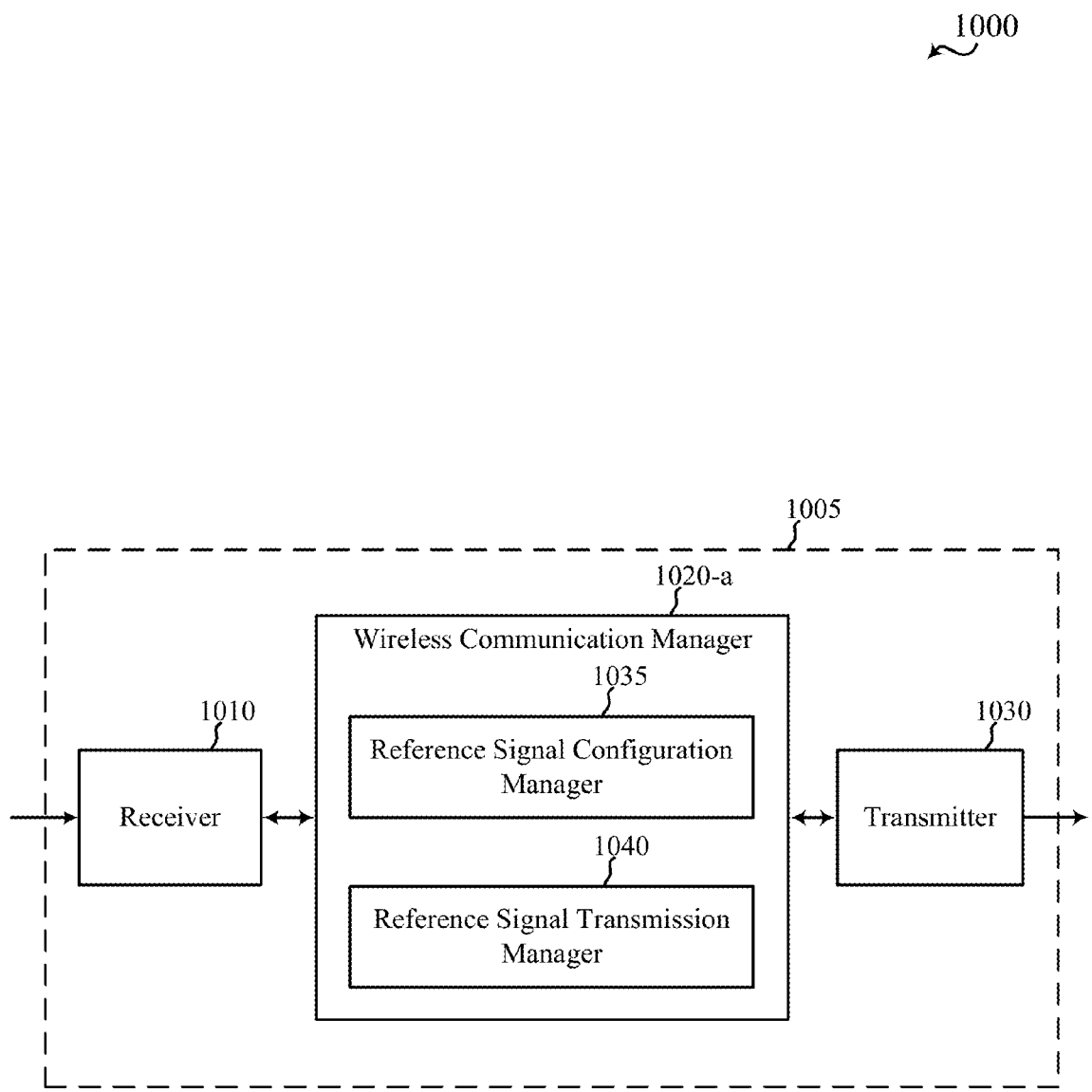
FIG. 10 shows a block diagram of an apparatus for use in wireless communication, in accordance with one or more aspects of the present disclosure.

FIG. 10 shows a block diagram 1000 of an apparatus 1005 for use in wireless communication, in accordance with one or more aspects of the present disclosure. The apparatus 1005 may be an example of aspects of one or more of the network access devices 105 described with reference to FIG. 1, 2, or 3. The apparatus 1005 may also be or include a processor. The apparatus 1005 may include a receiver 1010, a wireless communication manager 1020-*a*, or a transmitter 1030. Each of these components may be in communication with each other.

The components of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1010 may include at least one RF receiver, such as at least one RF receiver operable to receive transmissions over one or more radio frequency spectrum bands. In some examples, the one or more radio frequency spectrum bands may be used for communicating as described with reference to FIG. 1, 2, 3, 4, 5, 6, or 7. The receiver 1010 may be used to receive various types of data or control signals (i.e., transmissions) over one or more communication links of a wireless communication system, such as one or more communication links of the wireless communication system 100 described with reference to FIG. 1.

In some examples, the transmitter 1030 may include at least one RF transmitter, such as at least one RF transmitter operable to transmit over one or more radio frequency spectrum bands. In some examples, the one or more radio frequency spectrum bands may be used for communicating as described with reference to FIG. 1, 2, 3, 4, 5, 6, or 7. The transmitter 1030 may be used to transmit various types of data or control signals (i.e., transmissions) over one or more communication links of a wireless communication system, such as one or more communication links of the wireless communication system 100 described with reference to FIG. 1.

In some examples, the wireless communication manager 1020-*a* may be used to manage one or more aspects of wireless communication for the apparatus 1005. In some examples, part of the wireless communication manager 1020-*a* may be incorporated into or shared with the receiver 1010 or the transmitter 1030. In some examples, the wireless communication manager 1020-*a* may be an example of aspects of the wireless communication manager 1020 described with reference to FIG. 1. In some examples, the wireless communication manager 1020-*a* may include a reference signal configuration manager 1035 or a reference signal transmission manager 1040.

The reference signal configuration manager 1035 may be used to indicate, to a UE, a transmission timing of a control reference signal transmitted over a radio frequency spectrum band during an OFF duration of the UE with respect to the radio frequency spectrum band. The indicated transmission timing may be relative to a transition from the OFF duration to an ON duration of the UE with respect to the radio frequency spectrum band. The OFF duration and the ON duration may be coordinated between the UE and a wireless network (e.g., between the UE and the apparatus 1005). In some examples, the OFF duration and the ON duration may be part of a DRX cycle. In some examples, indicating the transmission timing of the control reference signal may include transmitting an indication of a semi-static configuration of the transmission timing. In some examples, the indication of the semi-static configuration of the transmission timing may be transmitted in at least one of system information (e.g., in a MIB or a SIB), or RRC signaling, or a combination thereof. The reference signal transmission manager 1040 may be used to transmit the control reference signal at the indicated transmission timing.

Figure 11:
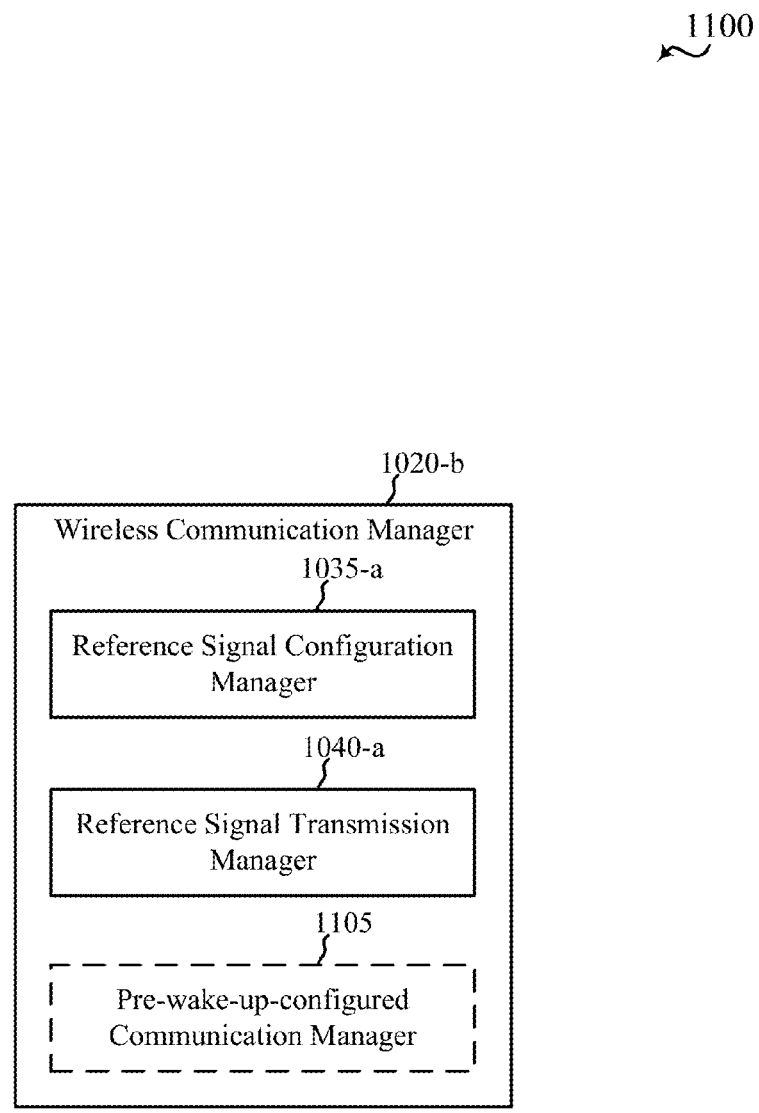
FIG. 11 shows a block diagram of a wireless communication manager for use in wireless communication, in accordance with one or more aspects of the present disclosure.

FIG. 11 shows a block diagram 1100 of a wireless communication manager 1020-*b* for use in wireless communication, in accordance with one or more aspects of the present disclosure. The wireless communication manager 1020-*b* may be an example of aspects of the wireless communication manager 1020 described with reference to FIG. 1 or 10.

The components of the wireless communication manager 1020-*b* may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 1020-*b* may be used to manage one or more aspects of wireless communication for a network access device or apparatus, such as one of the network access devices 105 or apparatuses 1005 described with reference to FIG. 1, 2, 3, or 10. In some examples, part of the wireless communication manager 1020-*b* may be incorporated into or shared with a receiver or a transmitter (e.g., the receiver 1010 or the transmitter 1030 described with reference to FIG. 10). In some examples, the wireless communication manager 1020-*b* may include a reference signal configuration manager 1035-*a*, a reference signal transmission manager 1040-*a*, or a pre-wake-up-configured communication manager 1105.

The reference signal configuration manager 1035-*a* may be used to indicate, to a UE, a transmission timing of a control reference signal transmitted over a radio frequency spectrum band during an OFF duration of the UE with respect to the radio frequency spectrum band. The indicated transmission timing may be relative to a transition from the OFF duration of the DRX cycle to an ON duration of the UE with respect to the radio frequency spectrum band. The OFF duration and the ON duration may be coordinated between the UE and a wireless network (e.g., between the UE and an apparatus including the wireless communication manager 1020-*b*). In some examples, the OFF duration and the ON duration may be part of a DRX cycle. In some examples, indicating the transmission timing of the control reference signal may include transmitting an indication of a semi-static configuration of the transmission timing. In some examples, the indication of the semi-static configuration of the transmission timing may be transmitted in at least one of system information (e.g., in a MIB or a SIB), or RRC signaling, or a combination thereof.

The reference signal transmission manager 1040-*a* may be used to transmit the control reference signal at the indicated transmission timing.

In some examples, the pre-wake-up-configured communication manager 1105 may be used to transmit, during a pre-wake-up duration between the transmission timing of the control reference signal and the ON duration, an indication of an aperiodic CSI-RS transmission timing. The aperiodic CSI-RS transmission timing may be between the pre-wake-up duration and the ON duration. The pre-wake-up-configured communication manager 1105 may also be used to transmit an aperiodic CSI-RS in accordance with the aperiodic CSI-RS transmission timing.

In some examples, the pre-wake-up-configured communication manager 1105 may be used to transmit a transmission request during a pre-wake-up duration between the transmission timing of the control reference signal and the ON duration. The transmission request may be associated with a transmission by the UE before the ON duration. In some examples, the transmission request may be associated with a second transmission timing, and an indication of the second transmission timing may be transmitted during the pre-wake-up duration. In some examples, the transmission request may include at least one of an aperiodic CSI transmission request, or an SRS transmission request, or a CQI transmission request, or a combination thereof. The pre-wake-up-configured communication manager 1105 may also be used to receive, before the ON duration and based at least in part on the transmission request, at least one of aperiodic CSI, or an SRS, or CQI, or a combination thereof. The received transmission(s) (e.g., aperiodic CSI, or, SRS, or CQI, or a combination thereof) may be used by the wireless communication manager 1020-*b*, a network access device including the wireless communication manager 1020-*b*, or a wireless network including the wireless communication manager 1020-*b*, to make at least one scheduling decision for the UE and/or for MCS/precoder selection for the UE.

In some examples, the reference signal reception manager 835-*s* may be further used to transmit, in a first TTI (e.g., symbol period or subframe) of the ON duration, a first instance of a type of reference signal. The first instance of the type of reference signal may have a higher density than a second instance of the type of reference signal, which second instance of the type of reference signal may be received in a second TTI having a later timing than the first TTI. In some examples, the higher density may include at least one of a first higher density in time, or a second higher density in frequency, or a combination thereof. In some examples, the type of reference signal may include a DMRS, a control reference signal, or a combination thereof. The first TTI may be the temporally first TTI of the ON duration or a later TTI of the ON duration.

Figure 12:
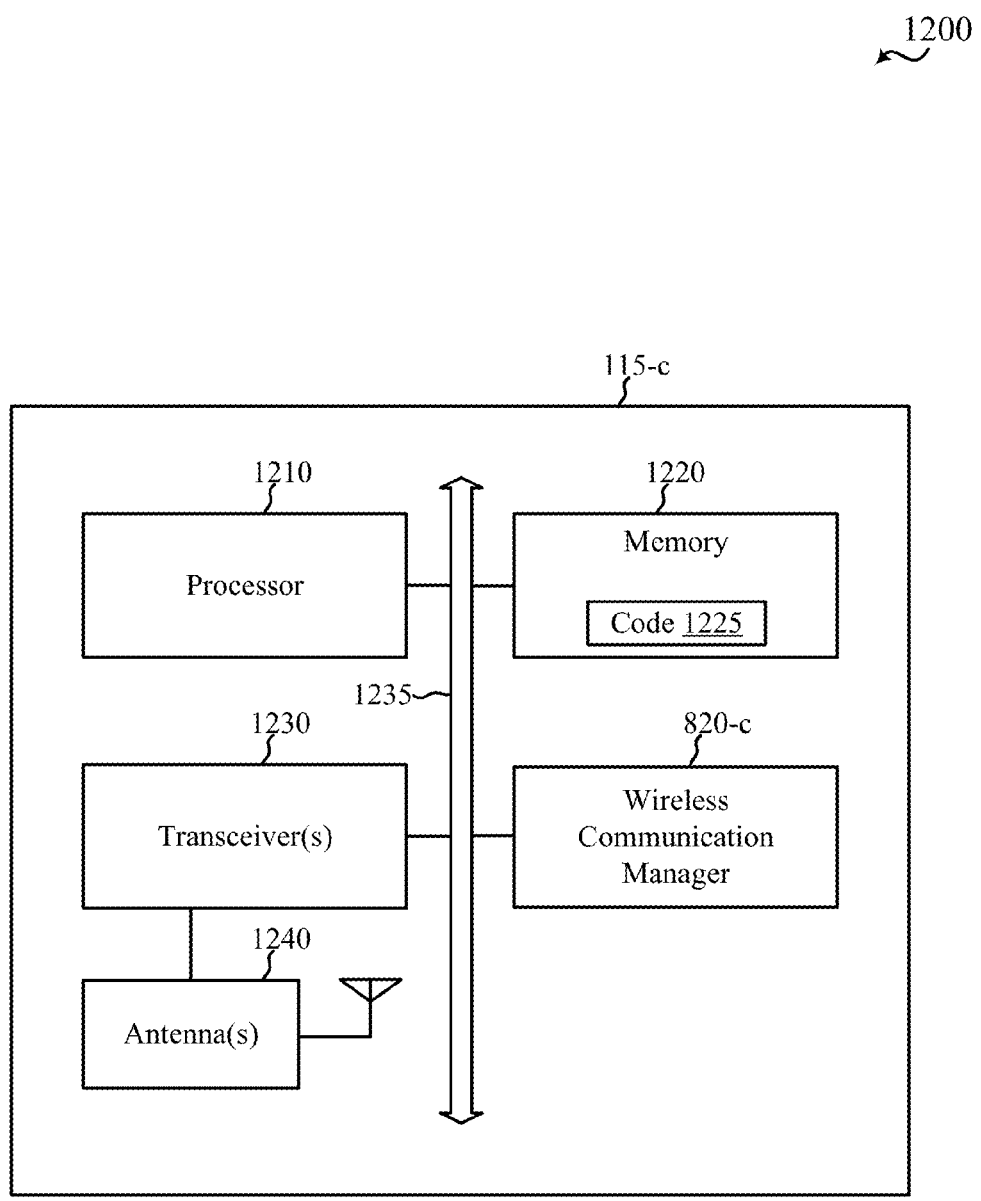
FIG. 12 shows a block diagram of a UE for use in wireless communication, in accordance with one or more aspects of the present disclosure.

FIG. 12 shows a block diagram 1200 of a UE 115-c for use in wireless communication, in accordance with one or more aspects of the present disclosure. The UE 115-c may be included or be part of a personal computer (e.g., a laptop computer, a netbook computer, a tablet computer, etc.), a cellular telephone, a PDA, a digital video recorder (DVR), an internet appliance, a gaming console, an e-reader, a vehicle, a home appliance, a lighting or alarm control system, etc. The UE 115-c may, in some examples, have an internal power supply (not shown), such as a small battery, to facilitate mobile operation. In some examples, the UE 115-c may be an example of aspects of one or more of the UEs 115 described with reference to FIG. 1, 2, or 3, or aspects of the apparatus 815 described with reference to FIG. 8. The UE 115-c may be configured to implement at least some of the UE or apparatus techniques and functions described with reference to FIG. 1, 2, 3, 4, 5, 6, 7, 8, or 9.

The UE 115-c may include a processor 1210, a memory 1220, at least one transceiver (represented by transceiver(s) 1230), antennas 1240 (e.g., an antenna array), or a wireless communication manager 820-c. Each of these components may be in communication with each other, directly or indirectly, over one or more buses 1235.

The memory 1220 may include random access memory (RAM) or read-only memory (ROM). The memory 1220 may store computer-readable, computer-executable code 1225 containing instructions that are configured to, when executed, cause the processor 1210 to perform various functions described herein related to wireless communication, including, for example, identifying a transmission timing of a control reference signal transmitted over a radio frequency spectrum band during an OFF duration of the UE with respect to a radio frequency spectrum band, receiving the control reference signal at the identified transmission timing, and performing a warm-up procedure, before the ON duration, based at least in part on the identified transmission timing of the control reference signal. Alternatively, the computer-executable code 1225 may not be directly executable by the processor 1210 but be configured to cause the UE 115-c (e.g., when compiled and executed) to perform various of the functions described herein.

The processor 1210 may include an intelligent hardware device, e.g., a central processing unit (CPU), a microcontroller, an ASIC, etc. The processor 1210 may process information received through the transceiver(s) 1230 or information to be sent to the transceiver(s) 1230 for transmission through the antennas 1240. The processor 1210 may handle, alone or in connection with the wireless communication manager 820-c, one or more aspects of communicating over (or managing communications over) one or more radio frequency spectrum bands.

The transceiver(s) 1230 may include a modem configured to modulate packets and provide the modulated packets to the antennas 1240 for transmission, and to demodulate packets received from the antennas 1240. The transceiver(s) 1230 may, in some examples, be implemented as one or more transmitters and one or more separate receivers. The transceiver(s) 1230 may support communications in one or more radio frequency spectrum bands. The transceiver(s) 1230 may be configured to communicate bi-directionally, via the antennas 1240, with one or more of the network access devices 105 described with reference to FIG. 1, 2, or 3, or the apparatus 1005 described with reference to FIG. 10.

The wireless communication manager 820-c may be configured to perform or control some or all of the UE or apparatus techniques or functions described with reference to FIG. 1, 2, 3, 4, 5, 6, 7, 8, or 9 related to wireless communication. The wireless communication manager 820-c, or portions of it, may include a processor, or some or all of the functions of the wireless communication manager 820-c may be performed by the processor 1210 or in connection with the processor 1210. In some examples, the wireless communication manager 820-c may be an example of the wireless communication manager 820 described with reference to FIG. 1, 8, or 9.

Figure 13:
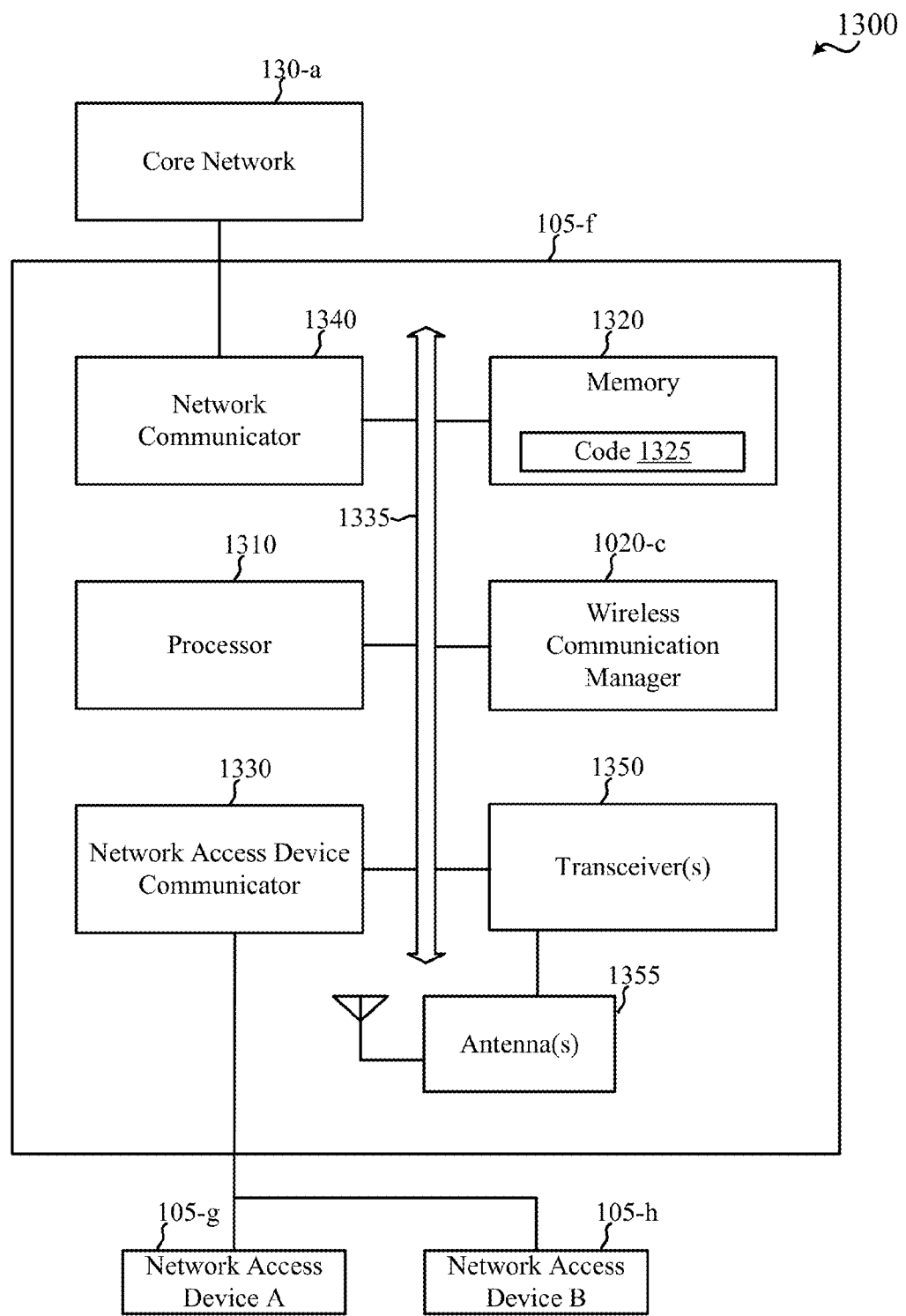
FIG. 13 shows a block diagram of a network access device for use in wireless communication, in accordance with one or more aspects of the present disclosure.

FIG. 13 shows a block diagram 1300 of a network access device 105-f for use in wireless communication, in accordance with one or more aspects of the present disclosure. In some examples, the network access device 105-f may be an example of one or more aspects of the network access devices 105 (e.g., a radio head, a base station, an eNB, or an ANC) described with reference to FIG. 1, 2, or 3, or aspects of the apparatus 1005 described with reference to FIG. 10. The network access device 105-f may be configured to implement or facilitate at least some of the network access device techniques and functions described with reference to FIG. 1, 2, 3, 4, 5, 6, 7, 10, or 11.

The network access device 105-f may include a processor 1310, a memory 1320, at least one transceiver (represented by transceiver(s) 1350), antennas 1355 (e.g., an antenna array), or a wireless communication manager 1020-c. The network access device 105-f may also include one or more of a network access device communicator 1330 or a network communicator 1340. Each of these components may be in communication with each other, directly or indirectly, over one or more buses 1335.

The memory 1320 may include RAM or ROM. The memory 1320 may store computer-readable, computer-executable code 1325 containing instructions that are configured to, when executed, cause the processor 1310 to perform various functions described herein related to wireless communication, including, for example, indicating, to a UE, a transmission timing of a control reference signal transmitted over a radio frequency spectrum band during an OFF duration of the UE with respect to the radio frequency spectrum band, and transmitting the control reference signal at the indicated transmission timing. Alternatively, the computer-executable code 1325 may not be directly executable by the processor 1310 but be configured to cause the network access device 105-f (e.g., when compiled and executed) to perform various of the functions described herein.

The processor 1310 may include an intelligent hardware device, e.g., a CPU, a microcontroller, an ASIC, etc. The processor 1310 may process information received through the transceiver(s) 1350, the network access device communicator 1330, or the network communicator 1340. The processor 1310 may also process information to be sent to the transceiver(s) 1350 for transmission through the antennas 1355, or to the network access device communicator 1330 for transmission to one or more other network access devices (e.g., network access device 105-g and network access device 105-h), or to the network communicator 1340 for transmission to a core network 130-a, which may be an example of one or more aspects of the core network 130 described with reference to FIG. 1. The processor 1310 may handle, alone or in connection with the wireless communication manager 1020-c, one or more aspects of communicating over (or managing communications over) one or more radio frequency spectrum bands.

The transceiver(s) 1350 may include a modem configured to modulate packets and provide the modulated packets to the antennas 1355 for transmission, and to demodulate packets received from the antennas 1355. The transceiver(s) 1350 may, in some examples, be implemented as one or more transmitters and one or more separate receivers. The transceiver(s) 1350 may support communications in one or more radio frequency spectrum bands. The transceiver(s) 1350 may be configured to communicate bi-directionally, via the antennas 1355, with one or more UEs or apparatuses, such as one of the UEs 115 described with reference to FIG. 1, 2, 3, or 12, or the apparatus 815 described with reference to FIG. 8. The network access device 105-f may communicate with the core network 130-a through the network communicator 1340. The network access device 105-f may also communicate with other network access devices, such as the network access device 105-g and the network access device 105-h, using the network access device communicator 1330.

The wireless communication manager 1020-c may be configured to perform or control some or all of the network access device or apparatus techniques or functions described with reference to FIG. 1, 2, 3, 4, 5, 6, 7, 10, or 11 related to wireless communication. The wireless communication manager 1020-c, or portions of it, may include a processor, or some or all of the functions of the wireless communication manager 1020-c may be performed by the processor 1310 or in connection with the processor 1310. In some examples, the wireless communication manager 1020-c may be an example of the wireless communication manager 1020 described with reference to FIG. 1, 10, or 11.

Figure 14:
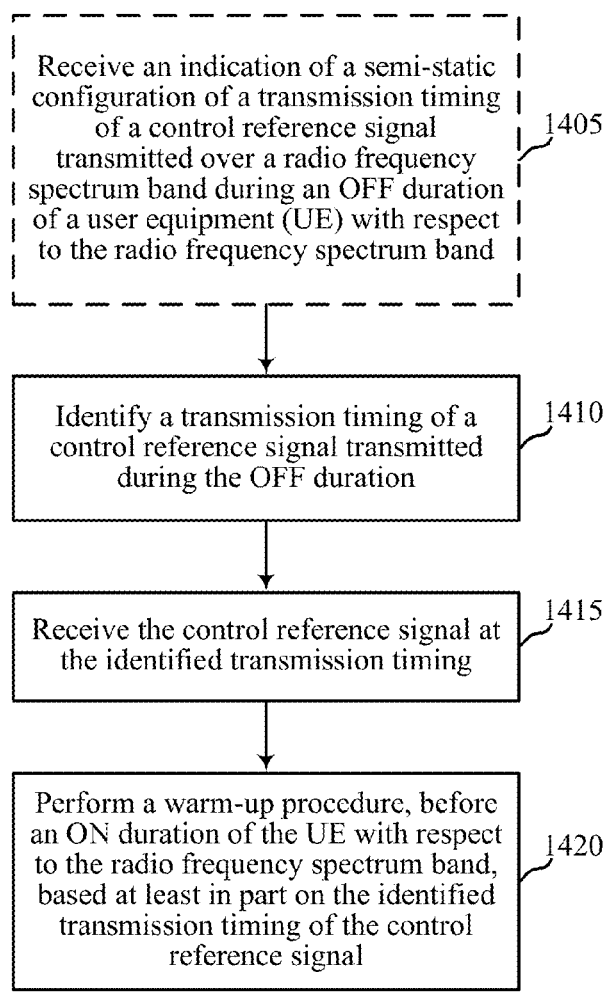
FIG. 14 is a flow chart illustrating an example of a method for wireless communication at a UE, in accordance with one or more aspects of the present disclosure.

FIG. 14 is a flow chart illustrating an example of a method 1400 for wireless communication at a UE, in accordance with one or more aspects of the present disclosure. For clarity, the method 1400 is described below with reference to aspects of one or more of the UEs 115 described with reference to FIG. 1, 2, 3, or 12, aspects of the apparatus 815 described with reference to FIG. 8, or aspects of one or more of the wireless communication managers 820 described with reference to FIG. 1, 8, 9, or 12. In some examples, a UE may execute one or more sets of codes to control the functional elements of the UE to perform the functions described below. Additionally or alternatively, the UE may perform one or more of the functions described below using special-purpose hardware.

At block 1405, the method 1400 may optionally include receiving an indication of a semi-static configuration of a transmission timing of a control reference signal transmitted over a radio frequency spectrum band during an OFF duration of the UE with respect to the radio frequency spectrum band. The transmission timing may be relative to a transition from the OFF duration to an ON duration of the UE with respect to the radio frequency spectrum band. The OFF duration and the ON duration may be coordinated with a wireless network (e.g., with a network access device of the wireless network). In some examples, the OFF duration and the ON duration may be part of a DRX cycle. In some examples, the indication of the semi-static configuration of the transmission timing may be received in at least one of system information (e.g., in a MIB or a SIB), or RRC signaling, or a combination thereof. The operation(s) at block 1405 may be performed using the wireless communication manager 820 described with reference to FIG. 1, 8, 9, or 12, or the communication configuration manager 905 described with reference to FIG. 9.

At block 1410, the method 1400 may include identifying a transmission timing of a control reference signal transmitted during the OFF duration. In some examples, the transmission timing may be identified based at least in part on an indication received at block 1405. The operation(s) at block 1410 may be performed using the wireless communication manager 820 described with reference to FIG. 1, 8, 9, or 12, or the reference signal reception manager 835 described with reference to FIG. 8 or 9.

At block 1415, the method 1400 may include receiving the control reference signal at the identified transmission timing. The operation(s) at block 1415 may be performed using the wireless communication manager 820 described with reference to FIG. 1, 8, 9, or 12, or the reference signal reception manager 835 described with reference to FIG. 8 or 9.

At block 1420, the method 1400 may include performing a warm-up procedure, before the ON duration, based at least in part on the identified transmission timing of the control reference signal. The operation(s) at block 1420 may be performed using the wireless communication manager 820 described with reference to FIG. 1, 8, 9, or 12, or the warm-up procedure manager 840 described with reference to FIG. 8 or 9.

Figure 15:
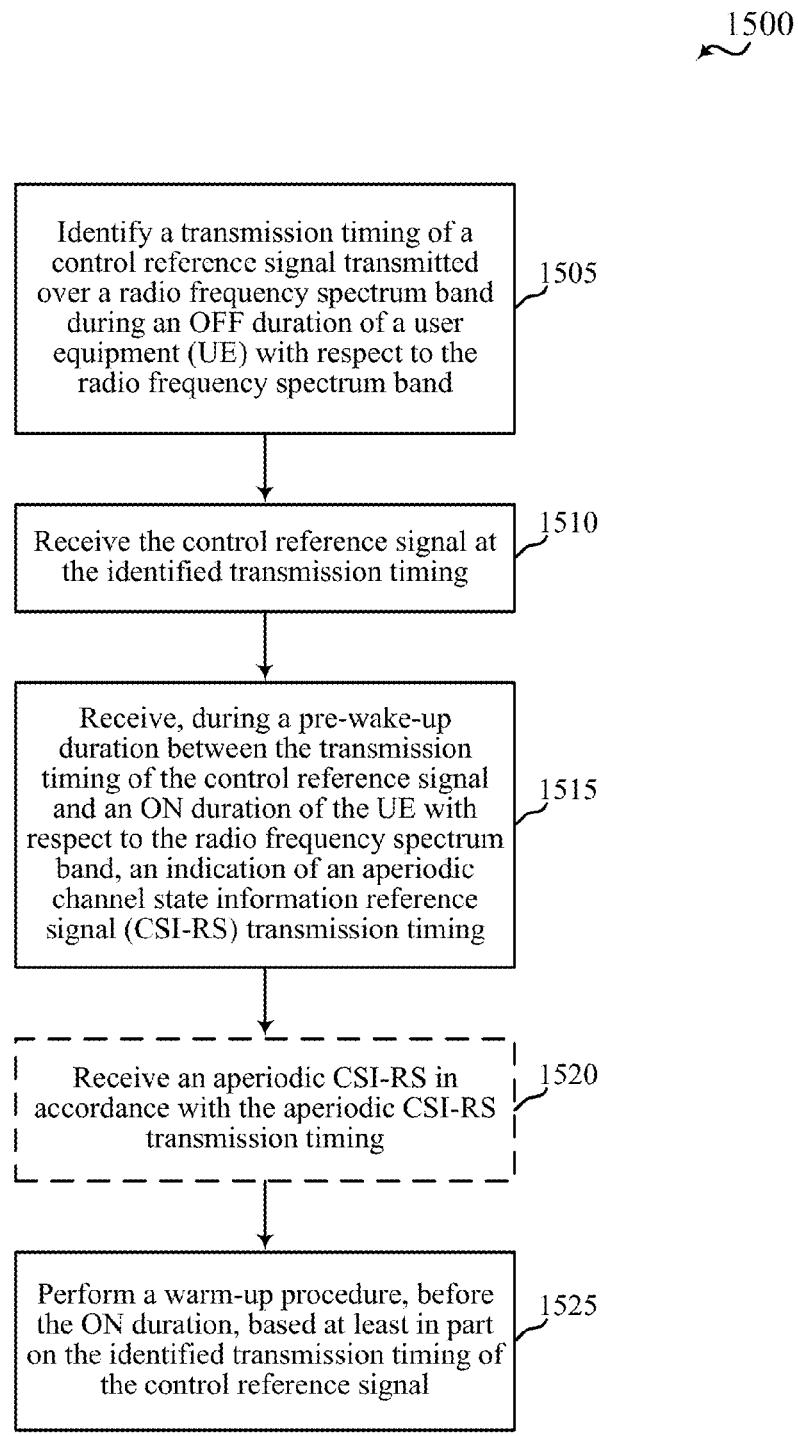
FIG. 15 is a flow chart illustrating an example of a method for wireless communication at a UE, in accordance with one or more aspects of the present disclosure.

FIG. 15 is a flow chart illustrating an example of a method 1500 for wireless communication at a UE, in accordance with one or more aspects of the present disclosure. For clarity, the method 1500 is described below with reference to aspects of one or more of the UEs 115 described with reference to FIG. 1, 2, 3, or 12, aspects of the apparatus 815 described with reference to FIG. 8, or aspects of one or more of the wireless communication managers 820 described with reference to FIG. 1, 8, 9, or 12. In some examples, a UE may execute one or more sets of codes to control the functional elements of the UE to perform the functions described below. Additionally or alternatively, the UE may perform one or more of the functions described below using special-purpose hardware.

At block 1505, the method 1500 may include identifying a transmission timing of a control reference signal transmitted over a radio frequency spectrum band during an OFF duration of the UE with respect to the radio frequency spectrum band. The identified transmission timing may be relative to a transition from the OFF duration to an ON duration of the UE with respect to the radio frequency spectrum band. The OFF duration and the ON duration may be coordinated with a wireless network (e.g., with a network access device of the wireless network). In some examples, the OFF duration and the ON duration may be part of a DRX cycle. The operation(s) at block 1505 may be performed using the wireless communication manager 820 described with reference to FIG. 1, 8, 9, or 12, or the reference signal reception manager 835 described with reference to FIG. 8 or 9.

At block 1510, the method 1500 may include receiving the control reference signal at the identified transmission timing. The operation(s) at block 1510 may be performed using the wireless communication manager 820 described with reference to FIG. 1, 8, 9, or 12, or the reference signal reception manager 835 described with reference to FIG. 8 or 9.

At block 1515, the method 1500 may include receiving, during a pre-wake-up duration between the transmission timing of the control reference signal and the ON duration, an indication of an aperiodic CSI-RS transmission timing. The aperiodic CSI-RS transmission timing may be between the pre-wake-up duration and the ON duration. The operation(s) at block 1515 may be performed using the wireless communication manager 820 described with reference to FIG. 1, 8, 9, or 12, or the pre-wake-up-configured communication manager 910 described with reference to FIG. 9.

At block 1520, the method 1500 may optionally include receiving an aperiodic CSI-RS in accordance with the aperiodic CSI-RS transmission timing. The operation(s) at block 1520 may be performed using the wireless communication manager 820 described with reference to FIG. 1, 8, 9, or 12, or the pre-wake-up-configured communication manager 910 described with reference to FIG. 9.

At block 1525, the method 1500 may include performing a warm-up procedure, before the ON duration, based at least in part on the identified transmission timing of the control reference signal. The warm-up procedure may also be performed based on the received aperiodic CSI-RS. The operation(s) at block 1525 may be performed using the wireless communication manager 820 described with reference to FIG. 1, 8, 9, or 12, or the warm-up procedure manager 840 described with reference to FIG. 8 or 9.

Figure 16:
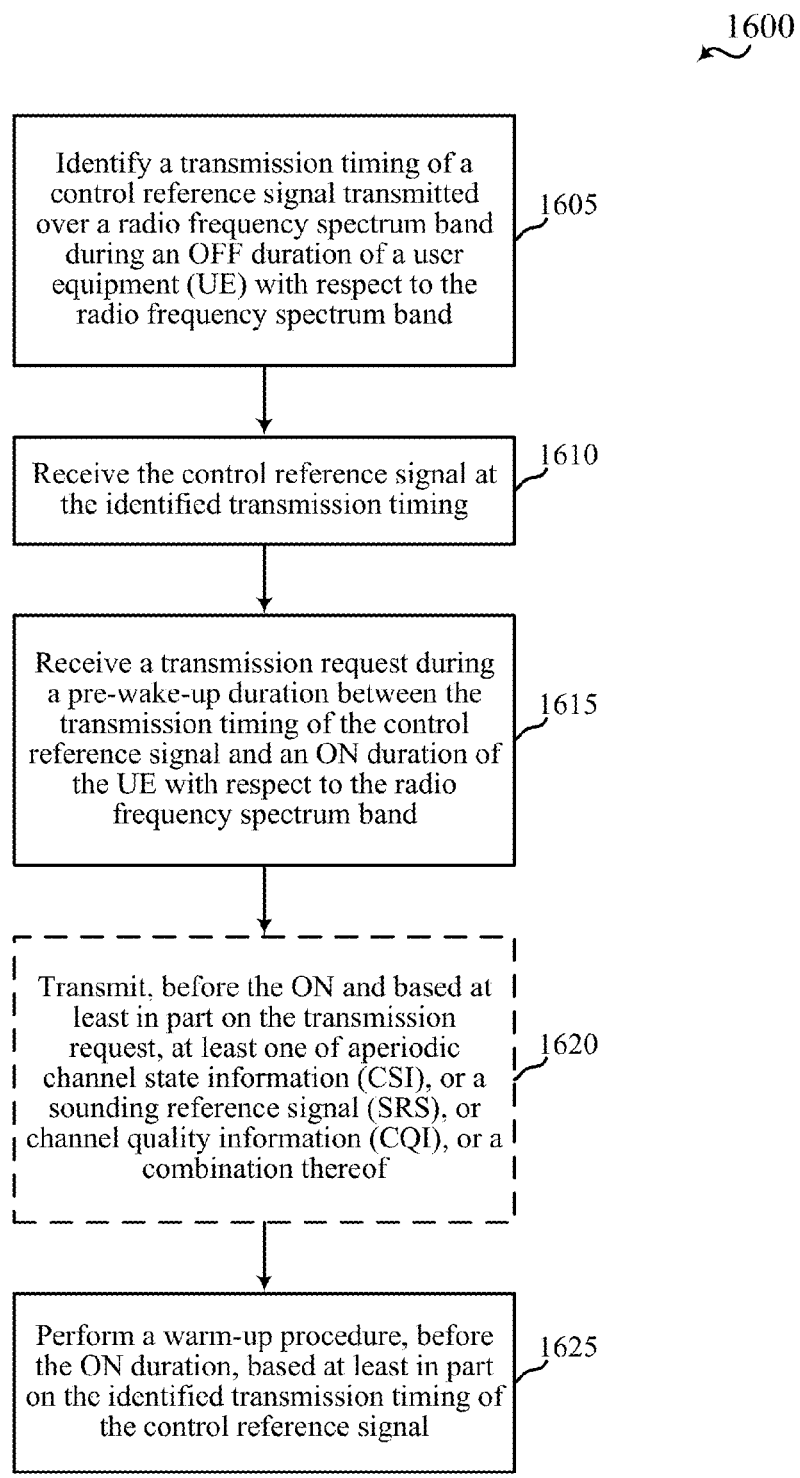
FIG. 16 is a flow chart illustrating an example of a method for wireless communication at a UE, in accordance with one or more aspects of the present disclosure.

FIG. 16 is a flow chart illustrating an example of a method 1600 for wireless communication at a UE, in accordance with one or more aspects of the present disclosure. For clarity, the method 1600 is described below with reference to aspects of one or more of the UEs 115 described with reference to FIG. 1, 2, 3, or 12, aspects of the apparatus 815 described with reference to FIG. 8, or aspects of one or more of the wireless communication managers 820 described with reference to FIG. 1, 8, 9, or 12. In some examples, a UE may execute one or more sets of codes to control the functional elements of the UE to perform the functions described below. Additionally or alternatively, the UE may perform one or more of the functions described below using special-purpose hardware.

At block 1605, the method 1600 may include identifying a transmission timing of a control reference signal transmitted over a radio frequency spectrum band during an OFF duration of the UE with respect to the radio frequency spectrum band. The identified transmission timing may be relative to a transition from the OFF duration to an ON duration of the UE with respect to the radio frequency spectrum band. The OFF duration and the ON duration may be coordinated with a wireless network (e.g., with a network access device of the wireless network). In some examples, the OFF duration and the ON duration may be part of a DRX cycle. The operation(s) at block 1605 may be performed using the wireless communication manager 820 described with reference to FIG. 1, 8, 9, or 12, or the reference signal reception manager 835 described with reference to FIG. 8 or 9.

At block 1610, the method 1600 may include receiving the control reference signal at the identified transmission timing. The operation(s) at block 1610 may be performed using the wireless communication manager 820 described with reference to FIG. 1, 8, 9, or 12, or the reference signal reception manager 835 described with reference to FIG. 8 or 9.

At block 1615, the method 1600 may include receiving a transmission request during a pre-wake-up duration between the transmission timing of the control reference signal and the ON duration. The transmission request may be associated with a transmission by the UE before the ON duration. In some examples, the transmission request may be associated with a second transmission timing, and an indication of the second transmission timing may be received during the pre-wake-up duration. In some examples, the transmission request may include at least one of an aperiodic CSI transmission request, or an SRS transmission request, or a CQI transmission request, or a combination thereof. The operation(s) at block 1615 may be performed using the wireless communication manager 820 described with reference to FIG. 1, 8, 9, or 12, or the pre-wake-up-configured communication manager 910 described with reference to FIG. 9.

At block 1620, the method 1600 may optionally include transmitting, before the ON duration and based at least in part on the transmission request, at least one of aperiodic CSI, or an SRS, or CQI, or a combination thereof. The operation(s) at block 1620 may be performed using the wireless communication manager 820 described with reference to FIG. 1, 8, 9, or 12, or the pre-wake-up-configured communication manager 910 described with reference to FIG. 9.

At block 1625, the method 1600 may include performing a warm-up procedure, before the ON duration, based at least in part on the identified transmission timing of the control reference signal. The operation(s) at block 1625 may be performed using the wireless communication manager 820 described with reference to FIG. 1, 8, 9, or 12, or the warm-up procedure manager 840 described with reference to FIG. 8 or 9.

Figure 17:
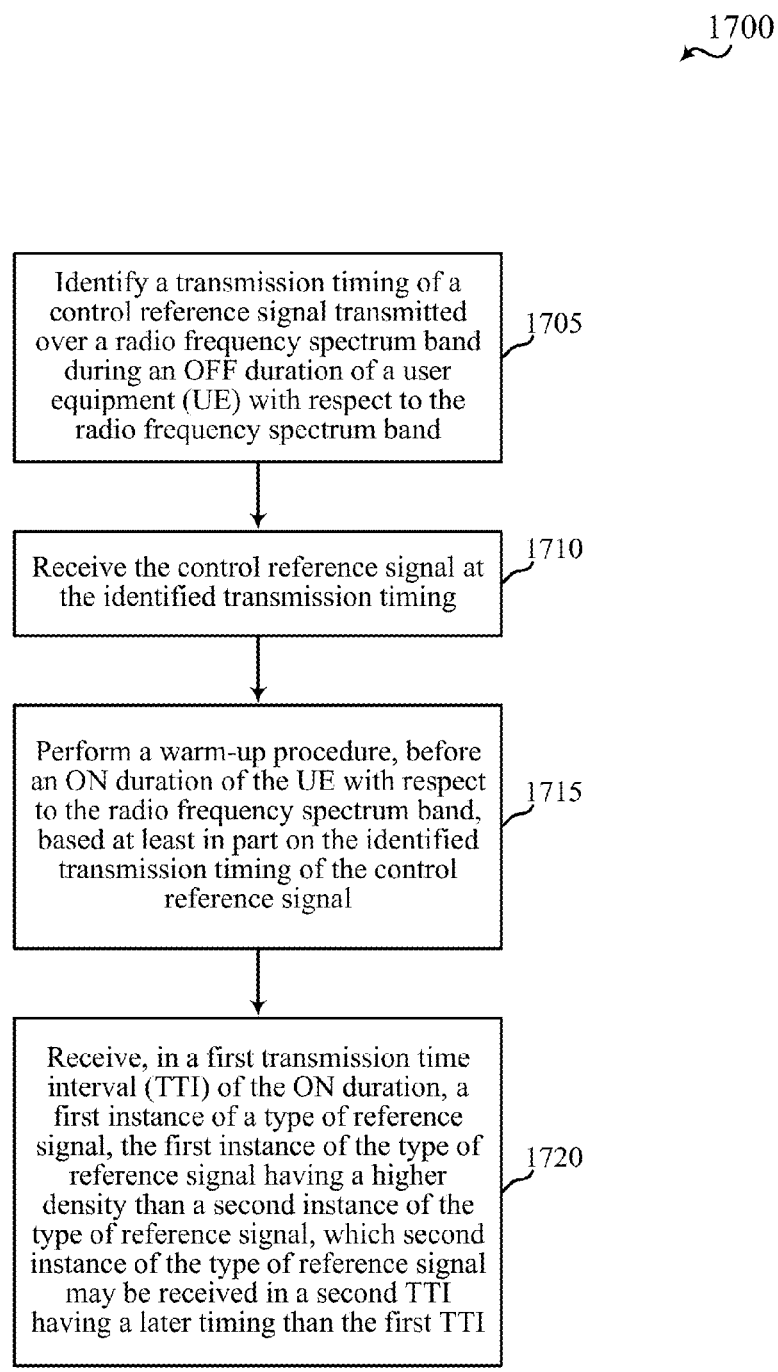
FIG. 17 is a flow chart illustrating an example of a method for wireless communication at a UE, in accordance with one or more aspects of the present disclosure.

FIG. 17 is a flow chart illustrating an example of a method 1700 for wireless communication at a UE, in accordance with one or more aspects of the present disclosure. For clarity, the method 1700 is described below with reference to aspects of one or more of the UEs 115 described with reference to FIG. 1, 2, 3, or 12, aspects of the apparatus 815 described with reference to FIG. 8, or aspects of one or more of the wireless communication managers 820 described with reference to FIG. 1, 8, 9, or 12. In some examples, a UE may execute one or more sets of codes to control the functional elements of the UE to perform the functions described below. Additionally or alternatively, the UE may perform one or more of the functions described below using special-purpose hardware.

At block 1705, the method 1700 may include identifying a transmission timing of a control reference signal transmitted over a radio frequency spectrum band during an OFF duration of the UE with respect to the radio frequency spectrum band. The identified transmission timing may be relative to a transition from the OFF duration to an ON duration of the UE with respect to the radio frequency spectrum band. The OFF duration and the ON duration may be coordinated with a wireless network (e.g., with a network access device of the wireless network). In some examples, the OFF duration and the ON duration may be part of a DRX cycle. The operation(s) at block 1705 may be performed using the wireless communication manager 820 described with reference to FIG. 1, 8, 9, or 12, or the reference signal reception manager 835 described with reference to FIG. 8 or 9.

At block 1710, the method 1700 may include receiving the control reference signal at the identified transmission timing. The operation(s) at block 1710 may be performed using the wireless communication manager 820 described with reference to FIG. 1, 8, 9, or 12, or the reference signal reception manager 835 described with reference to FIG. 8 or 9.

At block 1715, the method 1700 may include performing a warm-up procedure, before the ON duration, based at least in part on the identified transmission timing of the control reference signal. The operation(s) at block 1715 may be performed using the wireless communication manager 820 described with reference to FIG. 1, 8, 9, or 12, or the warm-up procedure manager 840 described with reference to FIG. 8 or 9.

At block 1720, the method 1700 may include receiving, in a first TTI (e.g., symbol period or subframe) of the ON duration, a first instance of a type of reference signal. The first instance of the type of reference signal may have a higher density than a second instance of the type of reference signal, which second instance of the type of reference signal may be received in a second TTI having a later timing than the first TTI. In some examples, the higher density may include at least one of a first higher density in time, or a second higher density in frequency, or a combination thereof. In some examples, the type of reference signal may include a DMRS, a control reference signal, or a combination thereof. The first TTI may be the temporally first TTI of the ON duration or a later TTI of the ON duration. The operation(s) at block 1720 may be performed using the wireless communication manager 820 described with reference to FIG. 1, 8, 9, or 12, or the reference signal reception manager 835 described with reference to FIG. 8 or 9.

The methods 1400, 1500, 1600, and 1700 described with reference to FIGS. 14, 15, 16, and 17 may provide for wireless communication. It should be noted that the methods 1400, 1500, 1600, and 1700 are example implementations of some of the techniques described in the present disclosure, and the operations of the methods 1400, 1500, 1600, and 1700 may be rearranged, combined with other operations of the same or different method, or otherwise modified, such that other implementations are possible. Operations may also be added to the methods 1400, 1500, 1600, and 1700.

Figure 18:
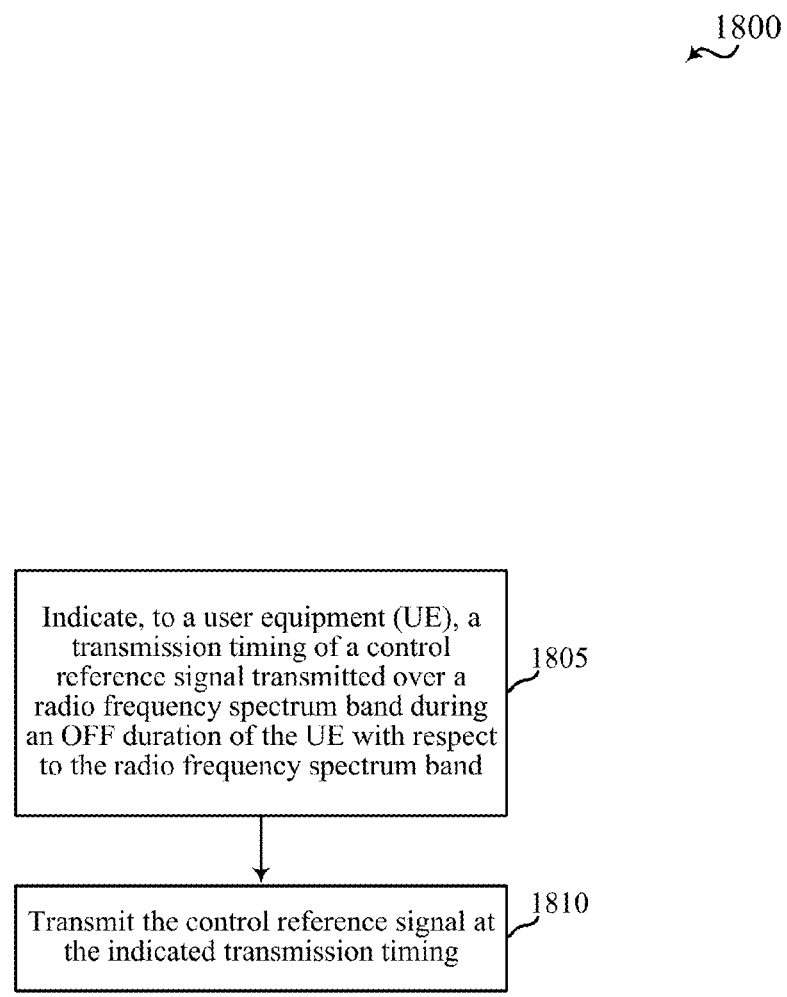
FIG. 18 is a flow chart illustrating an example of a method for wireless communication at a wireless network, in accordance with one or more aspects of the present disclosure.

FIG. 18 is a flow chart illustrating an example of a method 1800 for wireless communication at a wireless network, in accordance with one or more aspects of the present disclosure. For clarity, the method 1800 is described below with reference to aspects of one or more of the network access devices 105 described with reference to FIG. 1, 2, 3, or 13, aspects of the apparatus 1005 described with reference to FIG. 10, or aspects of one or more of the wireless communication managers 1020 described with reference to FIG. 1, 10, 11, or 13. In some examples, a wireless network may execute one or more sets of codes to control the functional elements of the wireless network (e.g., one or more network access devices 105) to perform the functions described below. Additionally or alternatively, the wireless network may perform one or more of the functions described below using special-purpose hardware.

At block 1805, the method 1800 may include indicating, to a UE, a transmission timing of a control reference signal transmitted over a radio frequency spectrum band during an OFF duration of a UE with respect to the radio frequency spectrum band. The indicated transmission timing may be relative to a transition from the OFF duration to an ON duration of the UE with respect to the radio frequency spectrum band. The OFF duration and the ON duration may be coordinated between the UE and the wireless network (e.g., between the UE and a network access device of the wireless network). In some examples, the OFF duration and the ON duration may be part of a DRX cycle. In some examples, indicating the transmission timing of the control reference signal may include transmitting an indication of a semi-static configuration of the transmission timing. In some examples, the indication of the semi-static configuration of the transmission timing may be transmitted in at least one of system information (e.g., in a MIB or a SIB), or RRC signaling, or a combination thereof. The operation(s) at block 1805 may be performed using the wireless communication manager 1020 described with reference to FIG. 1, 10, 11, or 13, or the reference signal configuration manager 1035 described with reference to FIG. 10 or 11.

At block 1810, the method 1800 may include transmitting the control reference signal at the indicated transmission timing. The operation(s) at block 1810 may be performed using the wireless communication manager 1020 described with reference to FIG. 1, 10, 11, or 13, or the reference signal transmission manager 1040 described with reference to FIG. 10 or 11.

Figure 19:
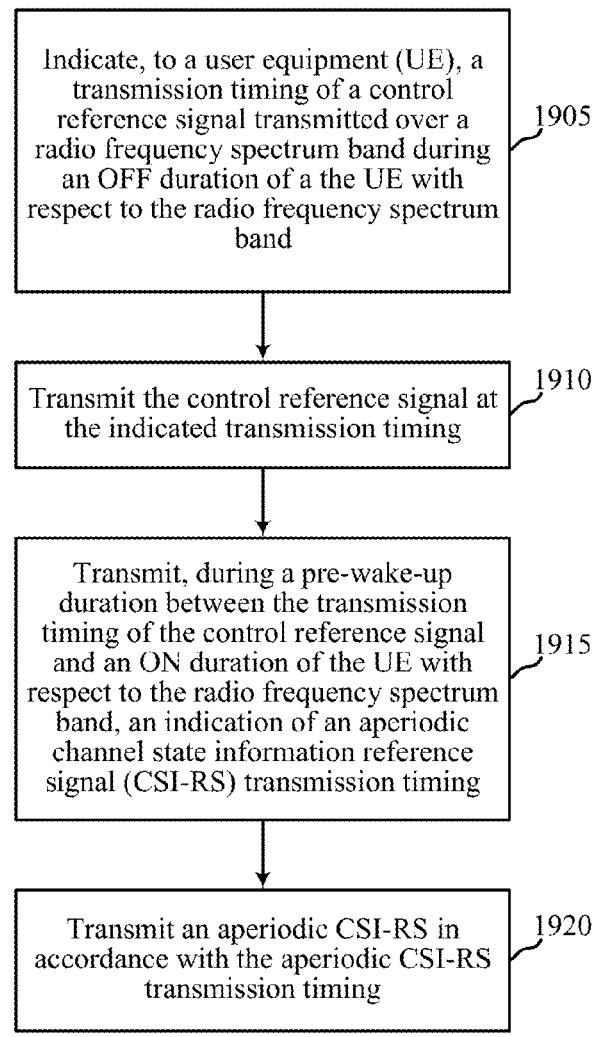
FIG. 19 is a flow chart illustrating an example of a method for wireless communication at a wireless network, in accordance with one or more aspects of the present disclosure.

FIG. 19 is a flow chart illustrating an example of a method 1900 for wireless communication at a wireless network, in accordance with one or more aspects of the present disclosure. For clarity, the method 1900 is described below with reference to aspects of one or more of the network access devices 105 described with reference to FIG. 1, 2, 3, or 13, aspects of the apparatus 1005 described with reference to FIG. 10, or aspects of one or more of the wireless communication managers 1020 described with reference to FIG. 1, 10, 11, or 13. In some examples, a wireless network may execute one or more sets of codes to control the functional elements of the wireless network (e.g., one or more network access devices 105) to perform the functions described below. Additionally or alternatively, the wireless network may perform one or more of the functions described below using special-purpose hardware.

At block 1905, the method 1900 may include indicating, to a UE, a transmission timing of a control reference signal transmitted over a radio frequency spectrum band during an OFF duration of the UE with respect to the radio frequency spectrum band. The indicated transmission timing may be relative to a transition from the OFF duration to an ON duration of the UE with respect to the radio frequency spectrum band. The OFF duration and the ON duration may be coordinated between the UE and the wireless network (e.g., between the UE and a network access device of the wireless network). In some examples, the OFF duration and the ON duration may be part of a DRX cycle. In some examples, indicating the transmission timing of the control reference signal may include transmitting an indication of a semi-static configuration of the transmission timing. In some examples, the indication of the semi-static configuration of the transmission timing may be transmitted in at least one of system information (e.g., in a MIB or a SIB), or RRC signaling, or a combination thereof. The operation(s) at block 1905 may be performed using the wireless communication manager 1020 described with reference to FIG. 1, 10, 11, or 13, or the reference signal configuration manager 1035 described with reference to FIG. 10 or 11.

At block 1910, the method 1900 may include transmitting the control reference signal at the indicated transmission timing. The operation(s) at block 1910 may be performed using the wireless communication manager 1020 described with reference to FIG. 1, 10, 11, or 13, or the reference signal transmission manager 1040 described with reference to FIG. 10 or 11.

At block 1915, the method 1900 may include transmitting, during a pre-wake-up duration between the transmission timing of the control reference signal and the ON duration, an indication of an aperiodic CSI-RS transmission timing. The aperiodic CSI-RS transmission timing may be between the pre-wake-up duration and the ON duration. The operation(s) at block 1915 may be performed using the wireless communication manager 1020 described with reference to FIG. 1, 10, 11, or 13, or the pre-wake-up-configured communication manager 1105 described with reference to FIG. 11.

At block 1920, the method 1900 may include transmitting an aperiodic CSI-RS in accordance with the aperiodic CSI-RS transmission timing. The operation(s) at block 1920 may be performed using the wireless communication manager 1020 described with reference to FIG. 1, 10, 11, or 13, or the pre-wake-up-configured communication manager 1105 described with reference to FIG. 11.

Figure 20:
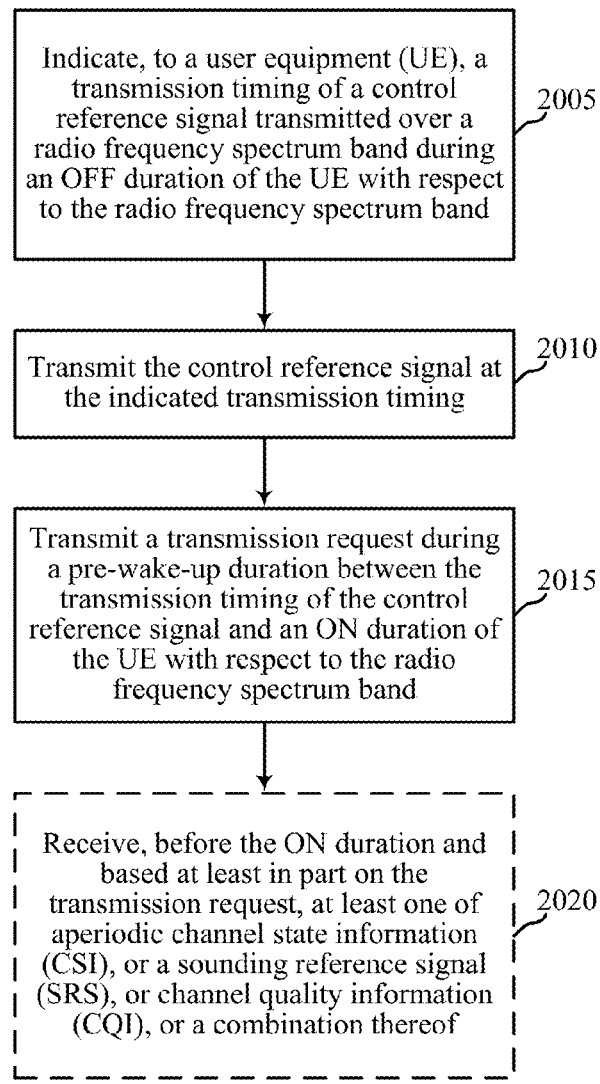
FIG. 20 is a flow chart illustrating an example of a method for wireless communication at a wireless network, in accordance with one or more aspects of the present disclosure.

FIG. 20 is a flow chart illustrating an example of a method 2000 for wireless communication at a wireless network, in accordance with one or more aspects of the present disclosure. For clarity, the method 2000 is described below with reference to aspects of one or more of the network access devices 105 described with reference to FIG. 1, 2, 3, or 13, aspects of the apparatus 1005 described with reference to FIG. 10, or aspects of one or more of the wireless communication managers 1020 described with reference to FIG. 1, 10, 11, or 13. In some examples, a wireless network may execute one or more sets of codes to control the functional elements of the wireless network (e.g., one or more network access devices 105) to perform the functions described below. Additionally or alternatively, the wireless network may perform one or more of the functions described below using special-purpose hardware.

At block 2005, the method 2000 may include indicating, to a UE, a transmission timing of a control reference signal transmitted over a radio frequency spectrum band during an OFF duration of the UE with respect to the radio frequency spectrum band. The indicated transmission timing may be relative to a transition from the OFF duration to an ON duration of the UE with respect to the radio frequency spectrum band. The OFF duration and the ON duration may be coordinated between the UE and the wireless network (e.g., between the UE and a network access device of the wireless network). In some examples, the OFF duration and the ON duration may be part of a DRX cycle. In some examples, indicating the transmission timing of the control reference signal may include transmitting an indication of a semi-static configuration of the transmission timing. In some examples, the indication of the semi-static configuration of the transmission timing may be transmitted in at least one of system information (e.g., in a MIB or a SIB), or RRC signaling, or a combination thereof. The operation(s) at block 2005 may be performed using the wireless communication manager 1020 described with reference to FIG. 1, 10, 11, or 13, or the reference signal configuration manager 1035 described with reference to FIG. 10 or 11.

At block 2010, the method 2000 may include transmitting the control reference signal at the indicated transmission timing. The operation(s) at block 2010 may be performed using the wireless communication manager 1020 described with reference to FIG. 1, 10, 11, or 13, or the reference signal transmission manager 1040 described with reference to FIG. 10 or 11.

At block 2015, the method 2000 may include transmitting a transmission request during a pre-wake-up duration between the transmission timing of the control reference signal and the ON duration. The transmission request may be associated with a transmission by the UE before the ON duration. In some examples, the transmission request may be associated with a second transmission timing, and an indication of the second transmission timing may be transmitted during the pre-wake-up duration. In some examples, the transmission request may include at least one of an aperiodic CSI transmission request, or an SRS transmission request, or a CQI transmission request, or a combination thereof. The operation(s) at block 2015 may be performed using the wireless communication manager 1020 described with reference to FIG. 1, 10, 11, or 13, or the pre-wake-up-configured communication manager 1105 described with reference to FIG. 11.

At block 2020, the method 2000 may optionally include receiving, before the ON duration and based at least in part on the transmission request, at least one of aperiodic CSI, or an SRS, or CQI, or a combination thereof. The received transmission(s) (e.g., aperiodic CSI, or, SRS, or CQI, or a combination thereof) may be used by the wireless network to make at least one scheduling decision for the UE and/or for MCS/precoder selection for the UE. The operation(s) at block 2020 may be performed using the wireless communication manager 1020 described with reference to FIG. 1, 10, 11, or 13, or the pre-wake-up-configured communication manager 1105 described with reference to FIG. 11.

Figure 21:
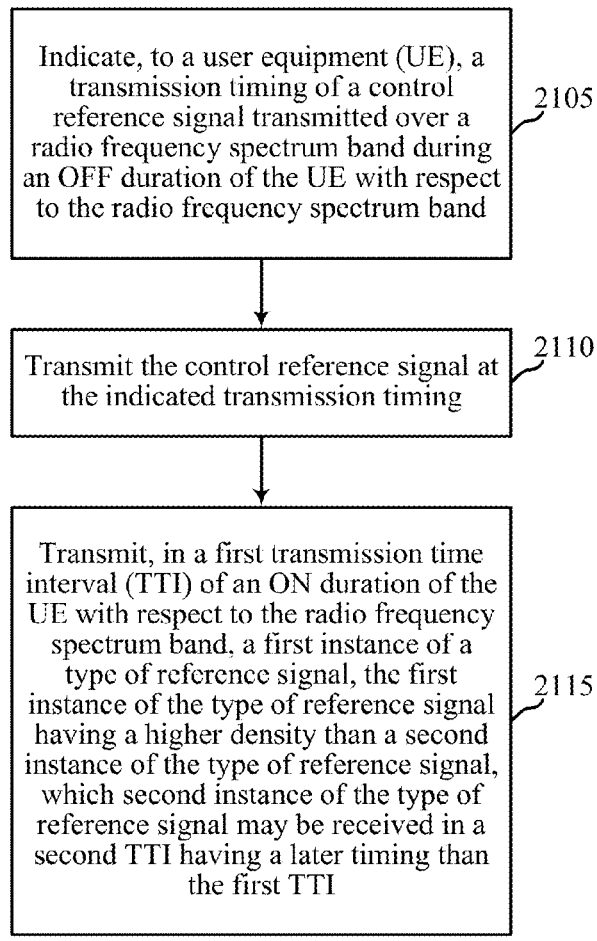
FIG. 21 is a flow chart illustrating an example of a method for wireless communication at a wireless network, in accordance with one or more aspects of the present disclosure.

FIG. 21 is a flow chart illustrating an example of a method 2100 for wireless communication at a wireless network, in accordance with one or more aspects of the present disclosure. For clarity, the method 2100 is described below with reference to aspects of one or more of the network access devices 105 described with reference to FIG. 1, 2, 3, or 13, aspects of the apparatus 1005 described with reference to FIG. 10, or aspects of one or more of the wireless communication managers 1020 described with reference to FIG. 1, 10, 11, or 13. In some examples, a wireless network may execute one or more sets of codes to control the functional elements of the wireless network (e.g., one or more network access devices 105) to perform the functions described below. Additionally or alternatively, the wireless network may perform one or more of the functions described below using special-purpose hardware.

At block 2105, the method 2100 may include indicating, to a UE, a transmission timing of a control reference signal transmitted over a radio frequency spectrum band during an OFF duration of the UE with respect to the radio frequency spectrum band. The indicated transmission timing may be relative to a transition from the OFF duration to an ON duration of the UE with respect to the radio frequency spectrum band. The OFF duration and the ON duration may be coordinated between the UE and the wireless network (e.g., between the UE and a network access device of the wireless network). In some examples, the OFF duration and the ON duration may be part of a DRX cycle. In some examples, indicating the transmission timing of the control reference signal may include transmitting an indication of a semi-static configuration of the transmission timing. In some examples, the indication of the semi-static configuration of the transmission timing may be transmitted in at least one of system information (e.g., in a MIB or a SIB), or RRC signaling, or a combination thereof. The operation(s) at block 2105 may be performed using the wireless communication manager 1020 described with reference to FIG. 1, 10, 11, or 13, or the reference signal configuration manager 1035 described with reference to FIG. 10 or 11.

At block 2110, the method 2100 may include transmitting the control reference signal at the indicated transmission timing. The operation(s) at block 2110 may be performed using the wireless communication manager 1020 described with reference to FIG. 1, 10, 11, or 13, or the reference signal transmission manager 1040 described with reference to FIG. 10 or 11.

At block 2115, the method 2100 may include transmitting, in a first TTI (e.g., symbol period or subframe) of the ON duration, a first instance of a type of reference signal. The first instance of the type of reference signal may have a higher density than a second instance of the type of reference signal, which second instance of the type of reference signal may be received in a second TTI having a later timing than the first TTI. In some examples, the higher density may include at least one of a first higher density in time, or a second higher density in frequency, or a combination thereof. In some examples, the type of reference signal may include a DMRS, a control reference signal, or a combination thereof. The first TTI may be the temporally first TTI of the ON duration or a later TTI of the ON duration. The operation(s) at block 2115 may be performed using the wireless communication manager 1020 described with reference to FIG. 1, 10, 11, or 13, or the reference signal transmission manager 1040 described with reference to FIG. 10 or 11.

The methods 1800, 1900, 2000, and 2100 described with reference to FIGS. 18, 19, 20, and 21 may provide for wireless communication. It should be noted that the methods 1800, 1900, 2000, and 2100 are example implementations of some of the techniques described in the present disclosure, and the operations of the methods 1800, 1900, 2000, and 2100 may be rearranged, combined with other operations of the same or different method, or otherwise modified, such that other implementations are possible. Operations may also be added to the methods 1800, 1900, 2000, and 2100.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
   identifying a transmission timing of a control reference signal transmitted over a radio frequency spectrum band during an OFF duration of the UE with respect to the radio frequency spectrum band, the identified transmission timing being relative to a transition from the OFF duration to an ON duration of the UE with respect to the radio frequency spectrum band, and the OFF duration and the ON duration coordinated with a wireless network;
   receiving the control reference signal at the identified transmission timing;
   receiving, during a pre-wake-up duration between the transmission timing of the control reference signal and the ON duration, a control channel including at least one of an indication of an aperiodic channel state information reference signal (CSI-RS) transmission timing or a transmission request; and
   performing a warm-up procedure, before the ON duration, based at least in part on the identified transmission timing of the control reference signal and the pre-wake up duration.

2. The method of claim 1, further comprising:
   receiving an indication of a semi-static configuration of the transmission timing.

3. The method of claim 2, wherein the indication of the semi-static configuration of the transmission timing is received in at least one of:
   system information, or radio resource control (RRC) signaling, or a combination thereof.

4. The method of claim 1, further comprising:
   receiving an aperiodic CSI-RS in accordance with the aperiodic CSI-RS transmission timing; and
   wherein the aperiodic CSI-RS transmission timing is between the pre-wake-up duration and the ON duration.

5. The method of claim 1, wherein the transmission request is associated with a transmission by the UE before the ON duration.

6. The method of claim 5, wherein the transmission request is associated with a second transmission timing, and an indication of the second transmission timing is received during the pre-wake-up duration.

7. The method of claim 5, further comprising:
   transmitting, before the ON duration and based at least in part on the transmission request, at least one of: aperiodic channel state information (CSI), or a sounding reference signal (SRS), or channel quality information (CQI), or a combination thereof.

8. The method of claim 1, further comprising:
   receiving, in a first transmission time interval (TTI) of the ON duration, a first instance of a type of reference signal, the first instance of the type of reference signal having a higher density than a second instance of the type of reference signal received in a second TTI having a later timing than the first TTI.

9. The method of claim 8, wherein the higher density comprises at least one of:
   a first higher density in time, or a second higher density in frequency, or a combination thereof.

10. The method of claim 1, wherein the OFF duration and the ON duration are part of a discontinuous reception (DRX) cycle.

11. A method for wireless communication at a wireless network, comprising:
    indicating, to a user equipment (UE), a transmission timing of a control reference signal transmitted over a radio frequency spectrum band during an OFF duration of the UE with respect to the radio frequency spectrum band, the indicated transmission timing being relative to a transition from the OFF duration to an ON duration of the UE with respect to the radio frequency spectrum band, and the OFF duration and the ON duration coordinated between the UE and the wireless network;
    transmitting the control reference signal at the indicated transmission timing; and
    transmitting, during a pre-wake-up duration between the transmission timing of the control reference signal and the ON duration, a control channel including at least one of an indication of an aperiodic channel state information reference signal (CSI-RS) transmission timing or a transmission request.

12. The method of claim 11, wherein indicating the transmission timing of the control reference signal comprises:
    transmitting an indication of a semi-static configuration of the transmission timing.

13. The method of claim 12, wherein the indication of the semi-static configuration of the transmission timing is transmitted in at least one of:
    system information, or radio resource control (RRC) signaling, or a combination thereof.

14. The method of claim 11, further comprising:
    transmitting an aperiodic CSI-RS in accordance with the aperiodic CSI-RS transmission timing; and
    wherein the aperiodic CSI-RS transmission timing is between the pre-wake-up duration and the ON duration.

15. The method of claim 11, wherein the transmission request is associated with a transmission by the UE before the ON duration.

16. The method of claim 15, wherein the transmission request is associated with a second transmission timing, and an indication of the second transmission timing is transmitted during the pre-wake-up duration.

17. The method of claim 15, further comprising:
receiving, before the ON duration and based at least in part on the transmission request, at least one of: aperiodic channel state information (CSI), or a sounding reference signal (SRS), or channel quality information (CQI), or a combination thereof.

18. The method of claim 11, further comprising:
transmitting, in a first transmission time interval (TTI) of the ON duration, a first instance of a type of reference signal, the first instance of the type of reference signal having a higher density than a second instance of the type of reference signal transmitted in a second TTI having a later timing than the first TTI.

19. The method of claim 18, wherein the higher density comprises at least one of:
a first higher density in time, or a second higher density in frequency, or a combination thereof.

20. The method of claim 11, wherein the OFF duration and the ON duration are part of a discontinuous reception (DRX) cycle.

21. An apparatus for wireless communication at a user equipment (UE), comprising:
means for identifying a transmission timing of a control reference signal transmitted over a radio frequency spectrum band during an OFF duration of the UE with respect to the radio frequency spectrum band, the identified transmission timing being relative to a transition from the OFF duration to an ON duration of the UE with respect to the radio frequency spectrum band, and the OFF duration and the ON duration coordinated with a wireless network;
means for receiving the control reference signal at the identified transmission timing;
means for receiving, during a pre-wake-up duration between the transmission timing of the control reference signal and the ON duration, a control channel including at least one of an indication of an aperiodic channel state information reference signal (CSI-RS) transmission timing or a transmission request; and
means for performing a warm-up procedure, before the ON duration, based at least in part on the identified transmission timing of the control reference signal and the pre-wake up duration.

22. The apparatus of claim 21, further comprising:
means for receiving an indication of a semi-static configuration of the transmission timing.

23. The apparatus of claim 21, further comprising:
means for receiving an aperiodic CSI-RS in accordance with the aperiodic CSI-RS transmission timing; and
wherein the aperiodic CSI-RS transmission timing is between the pre-wake-up duration and the ON duration.

24. The apparatus of claim 21, wherein the transmission request is associated with a transmission by the UE before the ON duration.

25. The apparatus of claim 21, further comprising:
means for receiving, in a first transmission time interval (TTI) of the ON duration, a first instance of a type of reference signal, the first instance of the type of reference signal having a higher density than a second instance of the type of reference signal received in a second TTI having a later timing than the first TTI.

26. An apparatus for wireless communication at a wireless network, comprising:
means for indicating, to a user equipment (UE), a transmission timing of a control reference signal transmitted over a radio frequency spectrum band during an OFF duration of the UE with respect to the radio frequency spectrum band, the indicated transmission timing being relative to a transition from the OFF duration to an ON duration of the UE with respect to the radio frequency spectrum band, and the OFF duration and the ON duration coordinated between the UE and the wireless network;
means for transmitting the control reference signal at the indicated transmission timing; and
means for transmitting, during a pre-wake-up duration between the transmission timing of the control reference signal and the ON duration, a control channel including at least one of an indication of an aperiodic channel state information reference signal (CSI-RS) transmission timing or a transmission request.

27. The apparatus of claim 26, wherein indicating the transmission timing of the control reference signal comprises:
transmitting an indication of a semi-static configuration of the transmission timing.

28. The apparatus of claim 26, further comprising:
means for transmitting an aperiodic CSI-RS in accordance with the aperiodic CSI-RS transmission timing; and
wherein the aperiodic CSI-RS transmission timing is between the pre-wake-up duration and the ON duration.

29. The apparatus of claim 26, wherein the transmission request is associated with a transmission by the UE before the ON duration.

30. The apparatus of claim 26, further comprising:
means for transmitting, in a first transmission time interval (TTI) of the ON duration, a first instance of a type of reference signal, the first instance of the type of reference signal having a higher density than a second instance of the type of reference signal transmitted in a second TTI having a later timing than the first TTI.

* * * * *